US011798263B1

(12) United States Patent
Prabhudesai et al.

(10) Patent No.: US 11,798,263 B1
(45) Date of Patent: Oct. 24, 2023

(54) MANUFACTURING DEFECTIVE OBJECT DETECTION SYSTEM

(71) Applicant: SAS Institute Inc., Cary, NC (US)

(72) Inventors: Kedar Shriram Prabhudesai, Charlottesville, VA (US); Jonathan Lee Walker, Raleigh, NC (US); Sanjeev Shyam Heda, Kennesaw, GA (US); Varunraj Valsaraj, Cary, NC (US); Allen Joseph Langlois, Apex, NC (US); Frederic Combaneyre, Sainte-Colombe-Pres-Vernon (FR); Hamza Mustafa Ghadyali, Apex, NC (US); Nabaruna Karmakar, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/295,337

(22) Filed: Apr. 4, 2023

Related U.S. Application Data

(60) Provisional application No. 63/409,152, filed on Sep. 22, 2022.

(51) Int. Cl.
    *G06V 10/764*      (2022.01)
    *G06V 10/24*      (2022.01)
    (Continued)

(52) U.S. Cl.
    CPC .......... *G06V 10/764* (2022.01); *G06T 7/0006* (2013.01); *G06V 10/24* (2022.01);
    (Continued)

(58) Field of Classification Search
    CPC ...... G06V 10/764; G06V 10/24; G06V 10/82; G06V 10/273; G06T 7/0006; G06T 2207/30164
See application file for complete search history.

(56) References Cited

U.S. PATENT DOCUMENTS 9,705,751 B1    7/2017   Yi et al.
10,867,380 B1   12/2020   Pathan et al.
(Continued)

OTHER PUBLICATIONS

Trafton, Anne, "Artificial Intelligence Helps Scale Up Advanced Solar Cell Manufacturing" https://scitechdaily.com/artificial-intelligence-helps-scale-up-advanced-solar-cell-manufacturing/#:~:text=Artificial, Massachusetts Institute of Technology, pp. 1-9, May 24, 2022.

(Continued)

*Primary Examiner* — David F Dunphy
(74) *Attorney, Agent, or Firm* — Bell & Manning, LLC

(57) ABSTRACT

A computing system detects a defective object. An image is received of a manufacturing line that includes objects in a process of being manufactured. Each pixel included in the image is classified as a background pixel class, a non-defective object class, or a defective object class using a trained neural network model. The pixels included in the image that were classified as the non-defective object class or the defective object class are grouped into polygons. Each polygon is defined by a contiguous group of pixels classified as the non-defective object class or the defective object class. Each polygon is classified in the non-defective object class or in the defective object class based on a number of pixels included in a respective polygon that are classified in the non-defective object class relative to a number of pixels included in the respective polygon that are classified in the defective object class.

30 Claims, 26 Drawing Sheets

(5 of 26 Drawing Sheet(s) Filed in Color)

(51) Int. Cl.
    *G06V 10/82*     (2022.01)
    *G06T 7/00*     (2017.01)
    *G06V 10/26*     (2022.01)

(52) U.S. Cl.
    CPC ............ *G06V 10/273* (2022.01); *G06V 10/82* (2022.01); *G06T 2207/30164* (2013.01)

(56) References Cited

U.S. PATENT DOCUMENTS

| | | |
|---|---|---|
| 11,055,639 B1 | 7/2021 | Cay et al. |
| 11,055,861 B2 | 7/2021 | Nazari et al. |
| 11,176,691 B2 | 11/2021 | Ghadyali et al. |
| 11,176,692 B2 | 11/2021 | Ghadyali et al. |
| 2020/0357191 A1* | 11/2020 | Khaloo ................ G06T 7/0004 |
| 2020/0364906 A1* | 11/2020 | Shimodaira ............ G06V 10/82 |
| 2021/0192714 A1* | 6/2021 | Bhatt ........................ G06T 7/11 |
| 2021/0368096 A1* | 11/2021 | Stawiaski ............ G06V 10/225 |
| 2021/0374928 A1* | 12/2021 | Hida ...................... G06N 3/045 |

OTHER PUBLICATIONS

Diermann, Ralph, "Artificial intelligence in photovoltaicproduction" https://www.pv-magazine.com/2020/12/22/artificial-intelligence-in-photovoltaic-production/, pv magazine group, pp. 1-7, Dec. 22, 2020.

SAS Institute Inc., "SAS® Visual Data Mining and Machine Learning 8.5: Procedures" pp. 1-88, Aug. 18, 2020.

Kahler, Susan, "Computer Vision with SAS®: Special Collection", SAS Institute Inc., pp. 1-112, 2020.

Durganjali, C. Santhi, et al., "Recent developments and future advancements in solar panels technology", Journal of Physics: Conference Series, vol. 1495, IOP Publishing, pp. 1-10, 2020.

Li, Fan, et al., "Machine learning (ML)-assisted design and fabrication for solar cells", Energy & Environmental Materials, vol. 2, pp. 280-291, (2019).

SAS Institute Inc., "SAS® Event Stream Processing 5.2: Creating and Using Windows" pp. 1-100, Feb. 2019.

Naber, Michael, "How artificial intelligence can be used to identify solar panel defects" pv magazine group, https://www.pv-magazine.com/2022/01/20/how-artificial-intelligence-can-be-used-to-identify-solar-panel-defects/, pp. 1-5, Jan. 20, 2022.

SAS Institute Inc., "Semantic Segmentation" pp. 1-24, Feb. 12, 2020.

Ronneberger, Olaf, Philipp Fischer, and Thomas Brox, "U-net: Convolutional networks for biomedical image segmentation", Medical Image Computing and Computer-Assisted Intervention-MICCAI 2015: 18th International Conference, Munich, Germany, Oct. 5-9, 2015, Proceedings, Part III 18. Springer International Publishing, pp. 1-8, 2015.

University of Freiburg, "U-Net: Convolutional Networks for Biomedical Image Segmentation", https://lmb.informatik.uni-freiburg.de/people/ronneber/u-net/, pp. 1-2, 2022.

Massachusetts Institute of Technology, Cambridge, MA, "Using AI to Help Scale Up Advanced Solar Cell Manufacturing" Tech Briefs, https://www.techbriefs.com/component/content/article/tb/pub/briefs/sustainable-technologies/46507, pp. 1-5, printed Sep. 1, 2022.

* cited by examiner

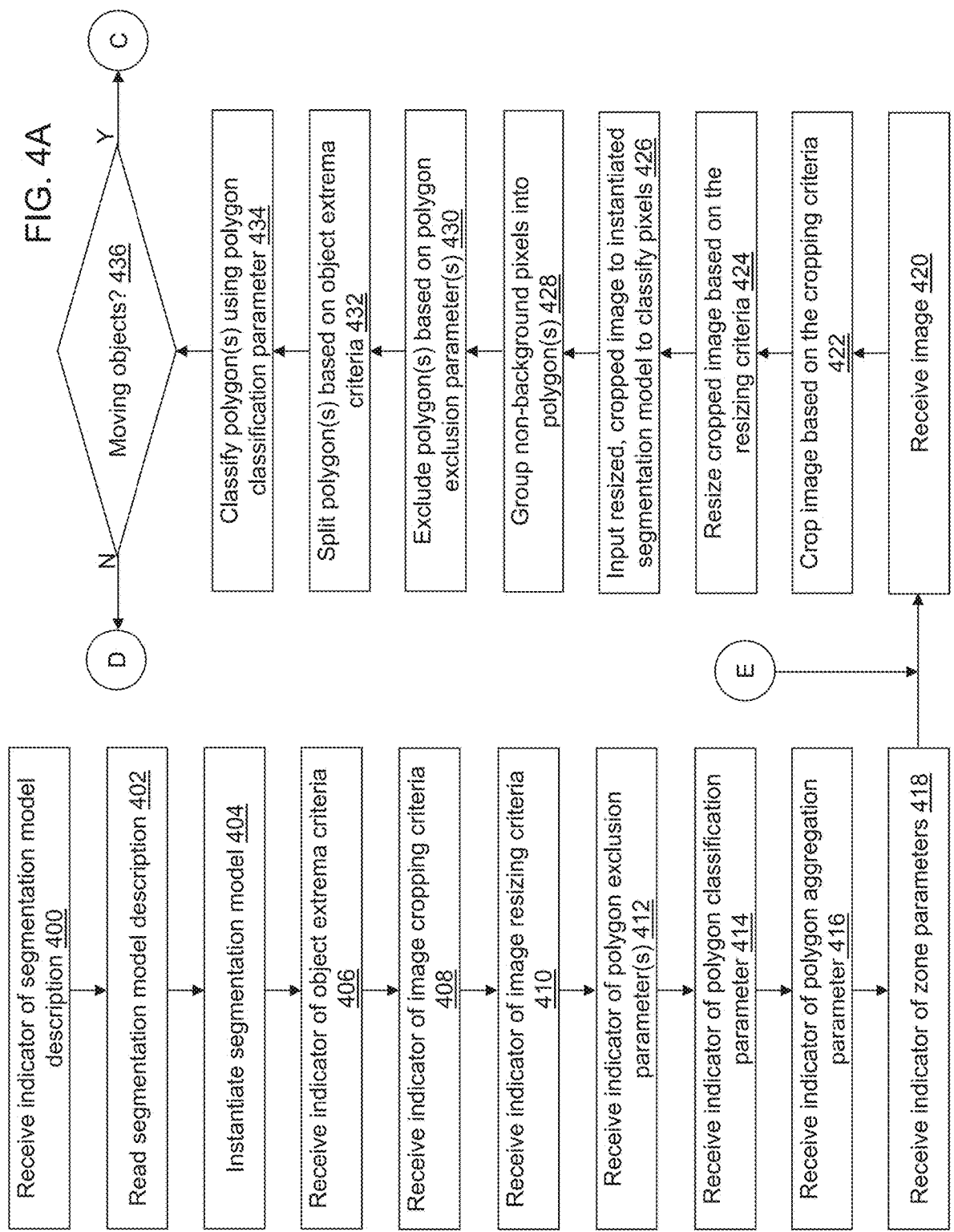

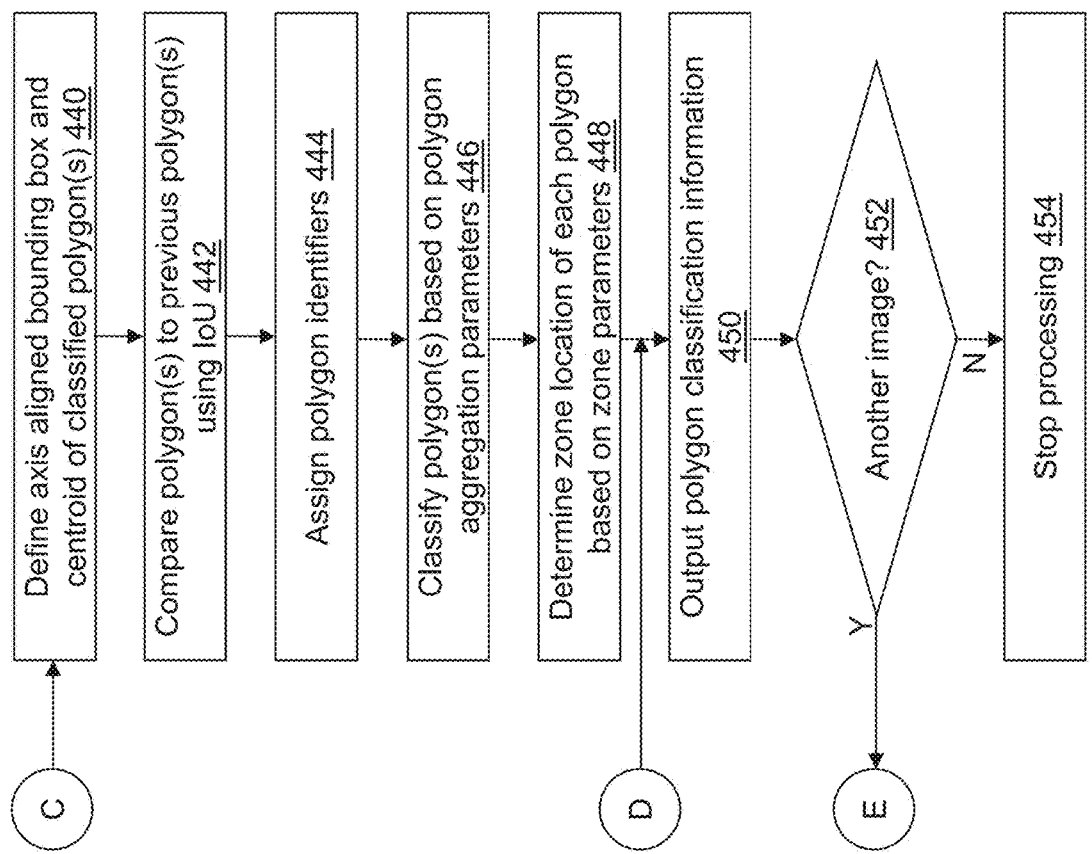

US 11,798,263 B1

MANUFACTURING DEFECTIVE OBJECT DETECTION SYSTEM

CROSS-REFERENCE TO RELATED APPLICATIONS

The present application claims the benefit of and priority under 35 U.S.C. § 119(e) to U.S. Provisional Patent Application No. 63/409,152 filed on Sep. 22, 2022, the entire contents of which are hereby incorporated by reference.

BACKGROUND

Manufacturers strive to make and/or build a quality product in the least amount of time possible. This requires that the manufacturing processing line be available and running as fast as possible. In continuous manufacturing lines, it is important to minimize any stoppage along the line because stoppage in one area can cause the entire manufacturing line to stop. Manufacturing lines include assembly lines. Manufacturers invest in technologies to identify and provide an alert when a potential downtime may occur to prevent or to minimize the unavailability of the manufacturing process line. For example, manufacturing factories may use devices deployed to manufacturing assembly lines to monitor the quality of objects moving on conveyor belts and detect if there are any defects so that a decision can be made regarding how to further process the defective object. For example, an object moving on a conveyor belt may be broken or defective, and the decision may be to divert the object into a reject bin. Improved defect detection devices can detect defective objects faster and with more accuracy to improve the manufacturing process.

SUMMARY

In an example embodiment, a non-transitory computer-readable medium is provided having stored thereon computer-readable instructions that, when executed by a computing device, cause the computing device to detect a defective object. An image is received of at least a portion of a manufacturing line that includes one or more objects in a process of being manufactured. Each pixel included in the image is classified as a background pixel class, a non-defective object class, or a defective object class using a trained neural network model. The pixels included in the image that were classified as the non-defective object class or the defective object class are grouped into one or more polygons. Each polygon is defined by a contiguous group of pixels classified as the non-defective object class or the defective object class. Each polygon is classified in the non-defective object class or in the defective object class based on a number of pixels included in a respective polygon that are classified in the non-defective object class relative to a number of pixels included in the respective polygon that are classified in the defective object class. The classification for each polygon as the non-defective object class or the defective object class is output.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to detect a defective object.

In yet another example embodiment, a method of detecting a defective object is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 4A and 4B depict a flow diagram illustrating examples of monitoring operations performed by the monitoring device of FIG. 3 in accordance with an illustrative embodiment.

DETAILED DESCRIPTION

Figure 1:
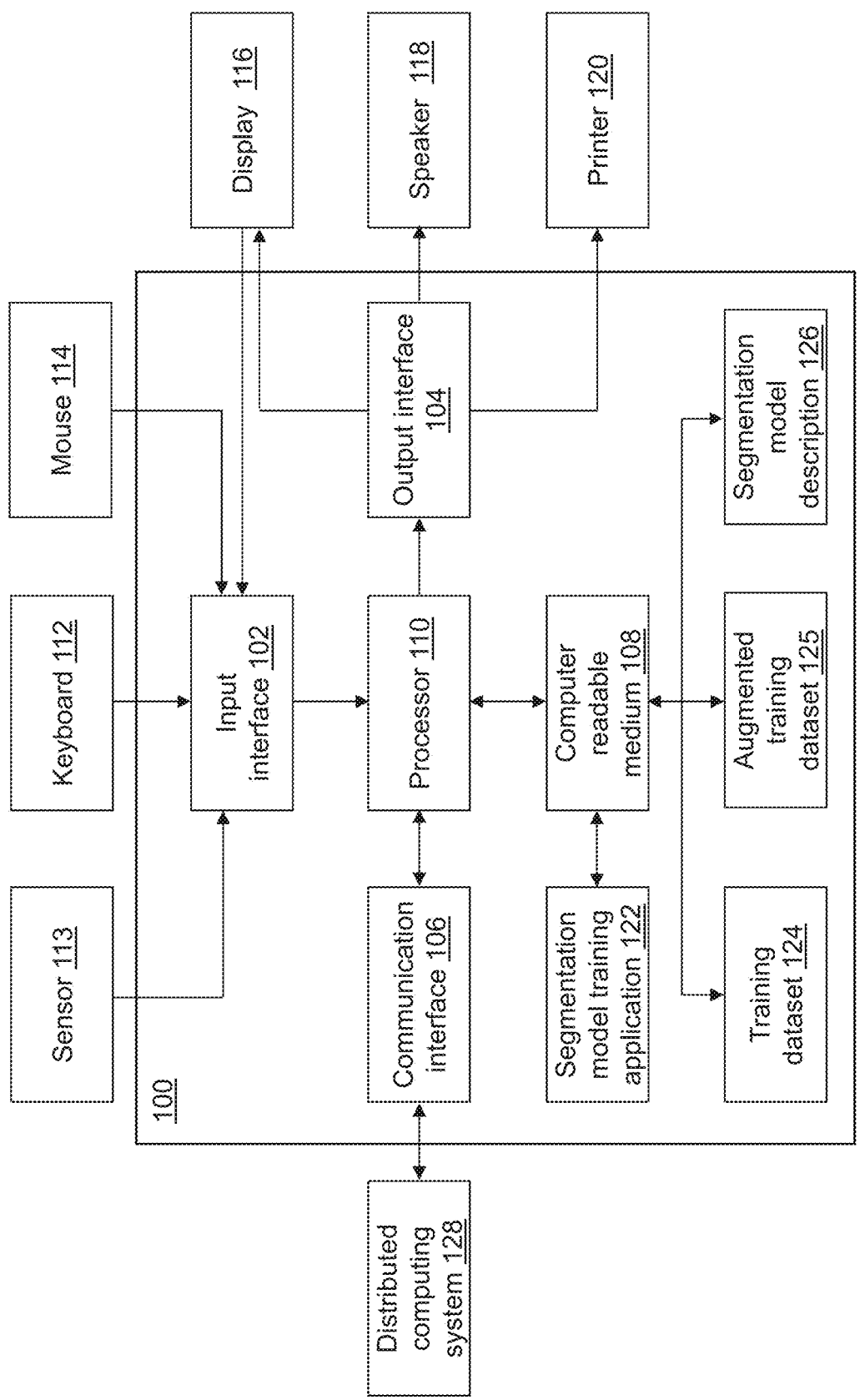
FIG. 1 depicts a block diagram of a segmentation model training device in accordance with an illustrative embodiment.

Neural networks are a class of machine learning models that consist of one or more transformation layers. Loosely speaking, each layer inputs a set of weights denoted by the matrix $W \in \mathbb{R}^{h \times m}$, a set of neurons $x \in \mathbb{R}^m$, and a bias term $\tau \in \mathbb{R}^m$. The set of weights are the neural network parameters. The corresponding output of the layer is itself a set of neurons $\alpha(x) \in \mathbb{R}^h$ defined by the transformation:

$$\alpha(x) = \theta(Wx + \tau),$$

where $\theta$ denotes the corresponding activation function. If there are l layers and the set of pairs $(W, \tau)$ are indexed by their corresponding layer index, the union of the set of parameters $U\{W_i, \tau_i\}_{i=1}^{l}$ becomes the corresponding optimization variables or parameters. For simplicity, a map from this set to a weight vector $w \in \mathbb{R}^m$ is assumed, where m corresponds to a total number of neurons across all layers. Henceforth, all notation is with respect to the weight vector w.

Deep learning models are a class of neural networks consisting of many layers. As in other machine learning approaches, in deep learning, a loss function is minimized $$\min_{w \in \mathbb{R}^m} f(w) = \frac{1}{N} \sum_{i=1}^{N} f_i(w; x_i, t_i),$$

where each $f_i(w)$ provides a measure of accuracy for the deep learning model applied to the $i^{th}$ observation in a training dataset which consists of N observations, $x_i$ indicates an observation vector, and $t_i$ indicates a target variable. $f_i(w)$ may be described as a loss or objective function.

Convolutional neural networks have been applied in many visual recognition tasks. Convolutional neural networks may be used to provide classification decisions, where the output in response to processing of an image is a class label for the image. However, in many visual tasks, the desired output may be a class label assigned to each pixel of the image and segmentation of the image. Semantic segmentation is a deep learning technique that enables understanding of an image at the pixel level. Specifically, semantic segmentation attempts to partition the image into semantically meaningful parts, and to classify each part into one of a plurality of predefined classes.

An encoder-decoder architecture further may be used where the encoder gradually reduces a spatial dimension of the image with pooling layers and a decoder gradually recovers object criteria and the spatial dimension. There may be shortcut connections from encoder to decoder to help the decoder recover the object criteria better. U-Net is a popular architecture from the encoder-decoder architecture class. For example, a U-Net fully convolutional neural network is described in a 2015 paper by Olaf Ronneberger, et al., titled U-Net: Convolutional Networks for Biomedical Image Segmentation. The U-Net fully convolutional neural network can segment an image into irregular shapes.

A monitoring device 300 (shown referring to FIG. 3) uses a trained segmentation model 126 (shown referring to FIG. 1) to classify pixels in an image of a manufacturing line to classify an object on the manufacturing line. Objects are identified by grouping non-background pixels into polygons that may be classified as either defective or non-defective, where defective may further include a plurality of class definitions to further describe a type of defect. For example, the object may be classified as broken and/or cracked. A broken object may be split into two or more distinct pieces, whereas, a cracked object remains as a single distinct piece but with a crack in the object. Though the term polygon is used herein for simplicity, the term is intended to include other shapes including an ellipse, a square, a rectangle, a circle, etc. as well as irregular shapes that are not strictly polygonal or elliptical.

Referring to FIG. 1, a block diagram of a segmentation model training device 100 is shown in accordance with an illustrative embodiment. Segmentation model training device 100 may include an input interface 102, an output interface 104, a communication interface 106, a non-transitory computer-readable medium 108, a processor 110, segmentation model training application 122, training dataset 124, augmented training dataset 125, and a segmentation model description 126. Fewer, different, and/or additional components may be incorporated into segmentation model training device 100.

Input interface 102 provides an interface for receiving information from the user or another device for entry into segmentation model training device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into segmentation model training device 100 or to make selections presented in a user interface displayed on display 116.

Sensor 113 captures and/or creates a two-dimensional image that is a measure of a physical phenomenon in a three-dimensional space. For example, sensor 113 may produce an image representative of a measure of a physical quantity in an environment to which sensor 113 is associated. Sensor 113 may generate successive images of the environment as a function of time. The environment to which sensor 113 is associated for monitoring may include a manufacturing line. Sensor 113 may be mounted to monitor a specific portion of a monitored system, such as a portion of a conveyor belt of a manufacturing line. The image includes a plurality of pixels in a two-dimensional space where each pixel has one or more values representative of the measured physical phenomenon. For example, sensor 113 may be a camera, a video camera, an infrared camera, a light detection and ranging device, etc. that can capture or create the image. For illustration, each pixel may include a red, a green, and a blue color value representative of a color associated with a respective pixel.

The same interface may support both input interface 102 and output interface 104. For example, display 116 comprising a touch screen provides a mechanism for user input and for presentation of output to the user. Segmentation model training device 100 may have one or more input interfaces that use the same or a different input interface technology. The input interface technology further may be accessible by segmentation model training device 100 through communication interface 106.

Output interface 104 provides an interface for outputting information for review by a user of segmentation model training device 100 and/or for use by another application or device. For example, output interface 104 may interface with various output technologies including, but not limited to, display 116, a speaker 118, a printer 120, etc. Segmentation model training device 100 may have one or more output interfaces that use the same or a different output interface technology. The output interface technology further may be accessible by segmentation model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Segmentation model training device 100 may have one or more communication interfaces that use the same or a different communication interface technology. For example, segmentation model training device 100 may support communication using an Ethernet port, a Bluetooth® antenna, a telephone jack, a USB port, etc. Data and/or messages may be transferred between segmentation model training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Segmentation model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Segmentation model training device 100 also may have one or more drives that support the loading of a memory media such as a CD, DVD, an external hard drive, etc. One or more external hard drives further may be connected to segmentation model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Segmentation model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Segmentation model training application 122 performs operations associated with creating segmentation model description 126 from data stored in augmented training dataset 125 that is created from training dataset 124. Segmentation model description 126 may be used to predict whether an image in an image dataset 324 (shown referring to FIG. 3) includes a defective object. Some or all of the operations described herein may be embodied in segmentation model training application 122. The operations may be implemented using hardware, firmware, software, or any combination of these methods.

Referring to the example embodiment of FIG. 1, segmentation model training application 122 is implemented in software (comprised of computer-readable and/or computer-executable instructions) stored in computer-readable medium 108 and accessible by processor 110 for execution of the instructions that embody the operations of segmentation model training application 122. Segmentation model training application 122 may be written using one or more programming languages, assembly languages, scripting languages, etc. Segmentation model training application 122 may be integrated with other analytic tools. As an example, segmentation model training application 122 may be part of an integrated data analytics software application and/or software architecture such as that offered by SAS Institute Inc. of Cary, North Carolina, USA. Merely for illustration, segmentation model training application 122 may be implemented using or integrated with one or more SAS software tools such as JMP®, Base SAS, SAS® Enterprise Miner™ SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, North Carolina, USA. Data mining, statistical analytics, and response prediction are practically applied in a wide variety of industries to solve technical problems.

Segmentation model training application 122 may be implemented as a Web application. For example, segmentation model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables defines a vector $x_i$ for each observation vector i=1,2, . . . , N, where N is a number of the observation vectors included in training dataset 124. Each observation included in training dataset 124 includes an image obtained from sensor 113 and an associated mask image that includes labels for regions in the image. Training dataset 124 may include observations that include one or more defective objects as well as one or more non-defective objects.

The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, North Carolina, USA. For example, data stored in training dataset 124 may be generated as part of the Internet of Things (I), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored on computer-readable medium 108 or on one or more computer-readable media of distributed computing system 128 and accessed by segmentation model training device 100 using communication interface 106, input interface 102, and/or output interface 104. Training dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training dataset 124 may be stored using various data structures as known to those skilled in the art including one or more files of a file system, a relational database, one or more tables of a system of tables, a structured query language database, etc. on segmentation model training device 100 or on distributed computing system 128. Segmentation model training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS Viya open, cloud-ready, in-memory architecture also may be used as an analytic platform to enable multiple users to concurrently access data stored in training dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
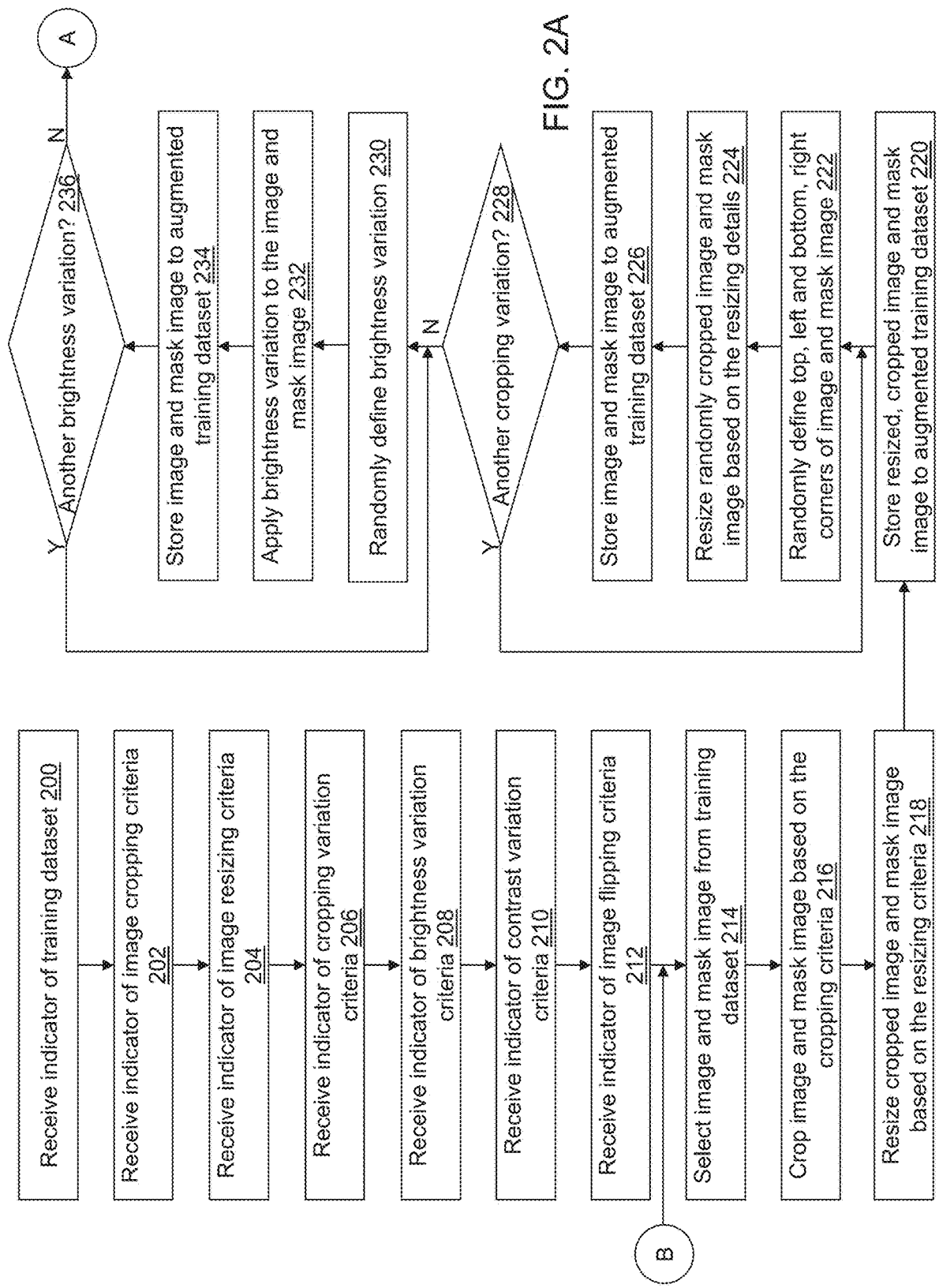
FIGS. 2A and 2B depict a flow diagram illustrating examples of segmentation model training operations performed by the segmentation model training device of FIG. 1 in accordance with an illustrative embodiment.
Figure 2B:
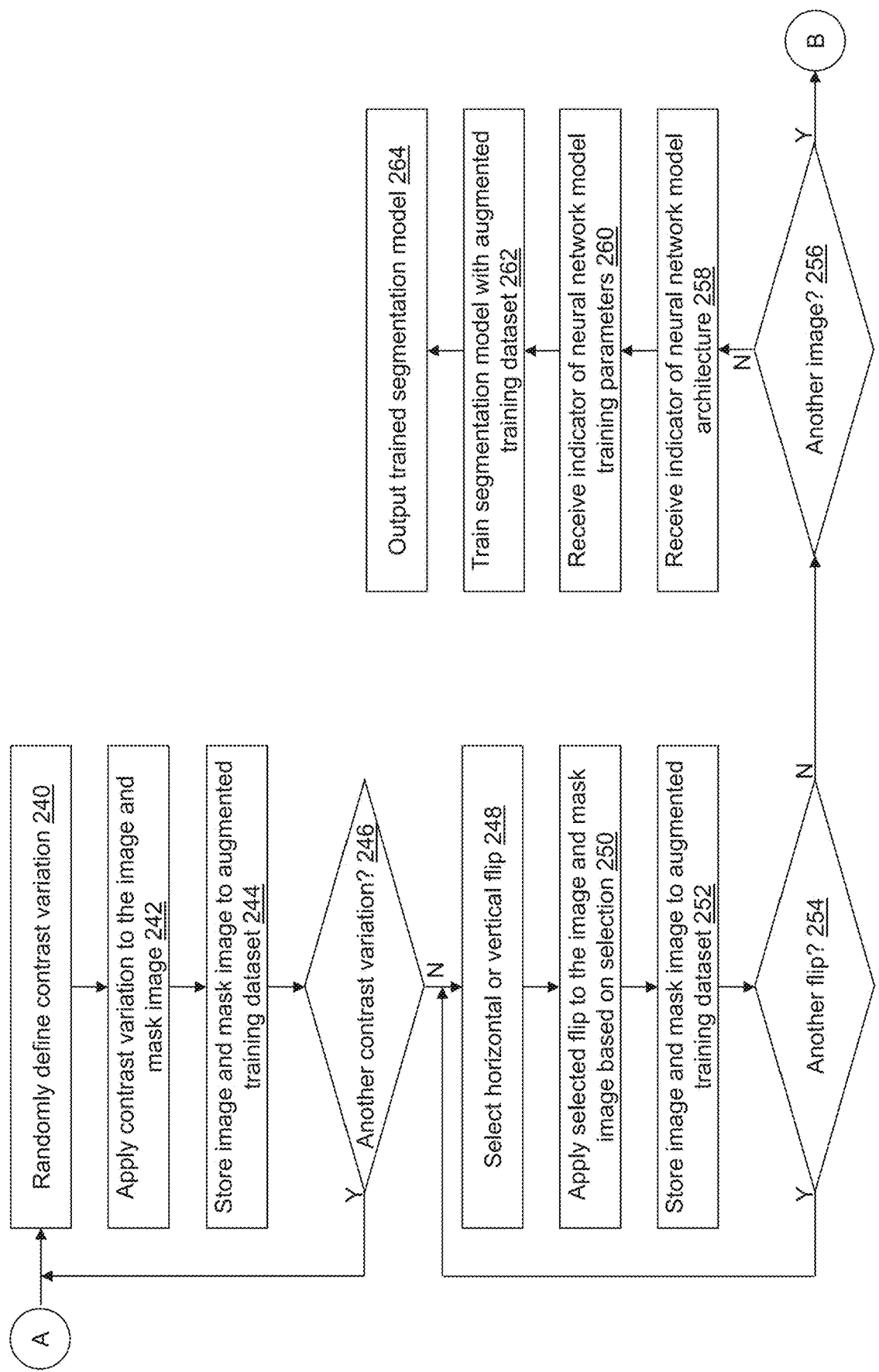

Referring to FIGS. 2A and 2B example operations associated with segmentation model training application 122 are described. Additional, fewer, or different operations may be performed depending on the embodiment of segmentation model training application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute segmentation model training application 122, which causes presentation of a first user interface window, which may include a plurality of menus and selectors such as drop-down menus, buttons, text boxes, hyperlinks, etc. associated with segmentation model training application 122 as understood by a person of skill in the art. The plurality of menus and selectors may be accessed in various orders. An indicator may indicate one or more user selections from a user interface, one or more data entries into a data field of the user interface such as a text box or a control window, one or more data items read from computer-readable medium 108, or otherwise defined with one or more default values, etc. that are received as an input by segmentation model training application 122. The operations of segmentation model training application 122 further may be performed in parallel using a plurality of threads and/or a plurality of worker computing devices.

Referring to FIG. 2A, in an operation 200, a first indicator may be received that indicates training dataset 124. For example, the first indicator indicates a location and a name of training dataset 124. As an example, the first indicator may be received by segmentation model training application 122 after selection from a user interface window or after entry by a user into a user interface window. In an alternative embodiment, training dataset 124 may not be selectable. For example, a most recently created dataset may be used automatically.

For illustration, individual images may be extracted from one or more videos and annotated by a user using polygons drawn around non-defective objects and defective objects and labeled appropriately. In some cases, the defective objects may further be annotated with polygons that indicate, for example, a broken object versus a cracked object. The annotated images may be used to generate mask images containing class numbers or class labels associated with predefined classes of interest. For illustration, a first class may indicate a non-defective object, a second class may indicate a broken object, a third class may indicate a cracked object, and a fourth class may indicate a background surrounding the objects. Each polygon included in the annotated images may have a class number or class label associated with it.

In an operation 202, a second indicator may be received that indicates image cropping criteria. For example, the image cropping criteria may include a first number of pixels to remove downward from a top, left corner in a y-axis direction, a second number of pixels to remove upward from a bottom, right corner in the y-axis direction, a third number of pixels to remove to the left from the bottom, right corner in an x-axis direction, and a fourth number of pixels to remove to the right from the top, left corner in the x-axis direction.

In an operation 204, a third indicator may be received that indicates image resizing criteria. For example, the image resizing criteria may include a fifth number of pixels to include in the y-axis direction and a sixth number of pixels to include in the x-axis direction. For illustration, each image may be resized to 256 by 256 pixels.

In an operation 206, a fourth indicator may be received that indicates cropping variation criteria. For example, the cropping variation criteria may include a distribution model indicator, one or more distribution model parameters, a maximum first number of pixels to remove downward from the top, left corner in the y-axis direction, a maximum second number of pixels to remove upward from the bottom, right corner in the y-axis direction, a maximum third number of pixels to remove to the left from the bottom, right corner in an x-axis direction, a maximum fourth number of pixels to remove to the right from the top, left corner in the x-axis direction, a minimum first number of pixels to remove downward from the top, left corner in the y-axis direction, a minimum second number of pixels to remove upward from the bottom, right corner in the y-axis direction, a minimum third number of pixels to remove to the left from the bottom, right corner in an x-axis direction, a minimum fourth number of pixels to remove to the right from the top, left corner in the x-axis direction, a number of variably cropped images to create for each image included in training dataset 124, whether to create variations from the top, left corner and/or the bottom, right corner, etc. The distribution model indicator may indicate a type of distribution model to use such as a Gaussian distribution model, a uniform distribution model, etc. The one or more distribution model parameters may vary based on the type of distribution model indicated. For example, the one or more distribution model parameters may include a mean and a standard deviation for the Gaussian distribution model.

In an operation 208, a fifth indicator may be received that indicates brightness variation criteria. For example, the brightness variation criteria may include a distribution model indicator, one or more distribution model parameters, a maximum brightness level, a minimum brightness level, and a number of variably bright images to create for each image included in training dataset 124, etc. For illustration, the distribution model G may be defined or indicated as $G(i,j)=a_1 \times F(i,j)+\beta_1$, where $\alpha_1$ and $\beta_1$ are distribution model parameters of the distribution model G, $F(i,j)$ is an $i,j^{th}$ brightness value in an original image, where i,j indicates a pixel location in the two-dimensional image.

In an operation 210, a sixth indicator may be received that indicates contrast variation criteria. For example, the contrast variation criteria may include a distribution model indicator, one or more distribution model parameters, a maximum contrast level, a minimum contrast level, and a number of variably contrasted images to create for each image included in training dataset 124, etc. For illustration, the distribution model H may be defined or indicated as $H(i,j)=a_2 \times F(i,j)+\beta_2$, where $\alpha_2$ and $\beta_2$ are distribution model parameters of the distribution model H, $F(i,j)$ is an $i,j^{th}$ contrast value in an original image, where i,j indicates a pixel location in the two-dimensional image. Contrast and brightness may be varied together when $\alpha_1=\alpha_2$ and $\beta_1=\beta_2$. A single brightness/contrast variation may be applied in a single step as described further below.

In an operation 212, a seventh indicator may be received that indicates image flipping criteria. For example, the image flipping criteria may include an indicator whether to flip the image horizontally, vertically, or in both directions.

Color jittering, image sharpening, and/or blurring are further data augmentation techniques that may be used. Color jittering alters hue and saturation parameters of the image along with brightness and contrast. Image sharpening and blurring, augment the training data by modifying edges of the objects of interest thereby changing how well the object is isolated from the background. This augmentation can be beneficial if at inference time it is expected that camera feed may produce blurry images. For example, a blurring phenomenon may be common with pan-tilt-zoom and autofocus cameras because the autofocus and zoom operation introduce blur and changes in sharpness.

In an operation 214, an image and its associated mask image are selected from training dataset 124. For example, on a first iteration of operation 214, a first observation is read from training dataset 124; on a second iteration of operation 214, a second observation is read from training dataset 124; and so on until each observation is selected from training dataset 124. Each observation includes an image and an associated mask image that has been annotated to identify objects in the image.

In an operation 216, the selected image and its associated mask image are cropped based on the image cropping criteria indicated in operation 202.

In an operation 218, the selected image and its associated mask image cropped in operation 202 are resized based on the image resizing criteria indicated in operation 204. For example, the selected image and its associated mask image may be cropped to focus on an area of interest in the selected image, such as a conveyor belt region of a manufacturing line. The cropped selected image and its associated mask image may be resized to a size of an input layer of a neural network to be trained using augmented training dataset 125.

In an operation 220, the resized, cropped image and its associated mask image are stored to augmented training dataset 125.

In an operation 222, the top, left corner and the bottom, right corner of the selected image and its associated mask image are randomly selected using the cropping variation criteria indicated in operation 206. By randomly selecting the corners of the selected image and its associated mask image, a location of the annotated polygons indicative of objects having one of the predefined classes is modified. The maximum and minimum value restrictions ensure that the area of interest remains in the selected image and its associated mask image.

In an operation 224, the randomly cropped image and its associated mask image are resized based on the image resizing criteria indicated in operation 204.

In an operation 226, the resized, randomly cropped image and its associated mask image are stored to augmented training dataset 125.

In operation 228, a determination is made concerning whether there is another randomly cropped image to create from the selected image and its associated mask image. When there is another randomly cropped image to create, processing continues in operation 222 to define another random crop. When there is not another randomly cropped image to create, processing continues in an operation 230. For example, when the number of variably cropped images to create for each image is greater than one, operations 222 through 226 are repeated that number of times.

In operation 230, a brightness variation is randomly defined using the brightness variation criteria indicated in operation 208.

In an operation 232, the defined brightness variation is applied to the resized, cropped image and its associated mask image. By randomly varying the brightness of the resized, cropped image and its associated mask image, variations in lighting conditions, a presence of shadows etc. may be included in augmented training dataset 125.

In an operation 234, the brightness varied, resized, cropped image and its associated mask image are stored to augmented training dataset 125.

In operation 236, a determination is made concerning whether there is another brightness varied image to create from the resized, cropped image and its associated mask image. When there is another brightness varied image to create, processing continues in operation 230 to define another brightness variation. When there is not another brightness varied image to create, processing continues in an operation 240 shown referring to FIG. 2B.

In operation 240, a contrast variation is randomly defined using the contrast variation criteria indicated in operation 210.

In an operation 242, the defined contrast variation is applied to the resized, cropped image and its associated mask image. By randomly varying the contrast of the resized, cropped image and its associated mask image, further variations in lighting conditions, a presence of shadows etc. may be included in augmented training dataset 125.

In an operation 244, the contrast varied, resized, cropped image and its associated mask image are stored to augmented training dataset 125.

In operation 246, a determination is made concerning whether there is another contrast varied image to create from the resized, cropped image and its associated mask image. When there is another contrast varied image to create, processing continues in operation 240 to define another contrast variation. When there is not another contrast varied image to create, processing continues in an operation 248.

As discussed above, contrast and brightness may be varied together using a single model. A single brightness/contrast variation may be applied by performing operations 230 through 236 and by skipping operations 240 through 246 such that processing from operation 236 continues with operation 248.

In operation 248, a horizontal or a vertical flip is selected using the image flipping criteria indicated in operation 212.

In an operation 250, the selected flip is applied to the resized, cropped image and its associated mask image. By flipping the resized, cropped image and its associated mask image, a location of the annotated polygons indicative of objects having one of the predefined classes is modified.

In an operation 252, the flipped, resized, cropped image and its associated mask image are stored to augmented training dataset 125.

In operation 254, a determination is made concerning whether there is another flipped image to create from the resized, cropped image and its associated mask image. When there is another flipped image to create, processing continues in operation 248 to select the remaining flip direction. When there is not another flipped image to create, processing continues in an operation 256.

In operation 256, a determination is made concerning whether there is another image and its associated mask image included in training dataset 124. When there is another image, processing continues in operation 214 to select and process the next observation from training dataset 124. When there is not another image, processing continues in an operation 258.

Operations 222 through 254 supplement the training dataset with different variations to artificially increase the amount of training observations without requiring additional labeling or annotation.

In operation 258, an eighth indicator indicates an architecture of the neural network to be trained to predict a classification for each pixel of each image included in augmented training dataset 125. The image resizing criteria defined in operation 204 define a resolution of the input layer of the neural network. The eighth indicator may be received by segmentation model training application 122 from a user interface window or after entry by a user into a user interface window. Default values that define the architecture may further be stored, for example, in computer-readable medium 108. For illustration, the architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels, a detection threshold, etc. may be defined as hyperparameters for training the neural network. The architecture may define a U-Net convolutional neural network. An automatic tuning method (autotune option) may be specified with one or more values or ranges of values to evaluate for each hyperparameter. The automatic tuning process may be used to identify the best settings for the hyperparameters though the hyperparameters may optionally be v1 selected as an input option by a user.

The image resizing criteria defined in operation 204 define a resolution of an input layer and an output layer of the neural network. A classification of each object may be correct or in error based on the annotation provided in the associated mask image. A measure of the error in terms of the objective function is fed back to drive an adjustment of weights associated with each neuron of neural network architecture. Gradients may be computed each iteration through a back propagation through the neural network architecture and used to drive an adjustment of weights associated with each neuron. Details associated with an illustrative architecture of the neural network are described in a paper titled U-Net: Convolutional Networks for Biomedical Image Segmentation by Olaf Ronneberger et al. published online May 18, 2015 by Cham Springer at arXiv: 1505.04597v1.

In an operation 260, a ninth indicator of neural network training parameters such as a mini-batch size, an objective function used and its associated parameters, an initial weight vector, a learning rate value, a Hessian approximation computation method, an initial step-size value, an optimization stop criteria, etc. may be received. In an alternative embodiment, the ninth indicator may not be received. For example, a default value may be stored, for example, in computer-readable medium 108 and used automatically for each neural network training parameter.

In an operation 262, a segmentation model is trained using the neural network model architecture indicated in operation 258, augmented training dataset 125, and the neural network training parameters indicated in operation 260. For example, the NNET provided by SAS® Visual Data Mining and Machine Learning software may be used to train the segmentation model.

In an operation 264, a description of the trained segmentation model is output. For example, the trained segmentation model description may be output to segmentation model description 126. For example, segmentation model description 126 indicates a file to which the description of the trained segmentation model is written. The neural network model description may include the neural network architecture. For illustration, the trained neural network model may be stored using the ASTORE procedure provided by SAS® Visual Data Mining and Machine Learning software.

Figure 3:
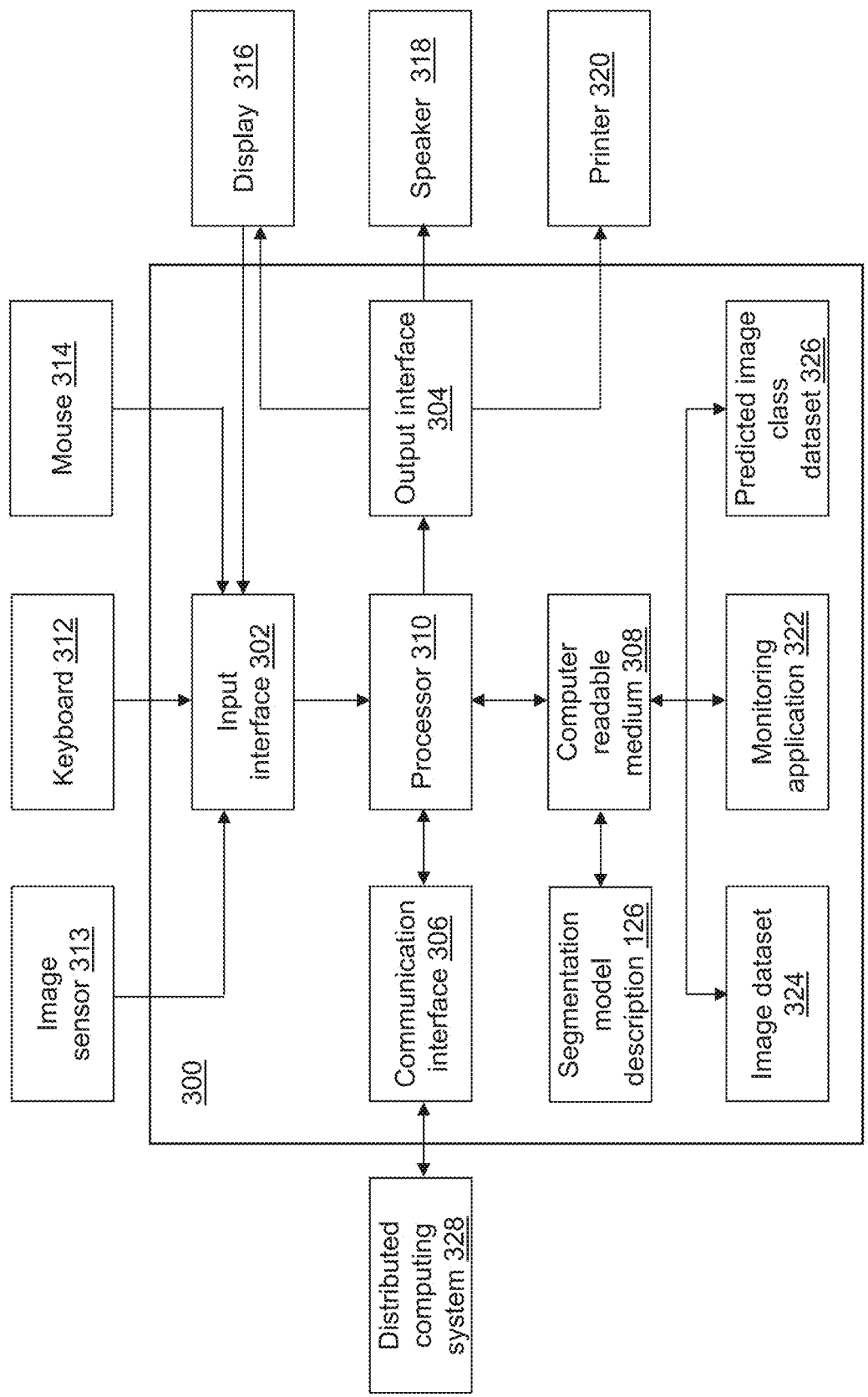
FIG. 3 depicts a block diagram of a monitoring device in accordance with an illustrative embodiment.

Referring to FIG. 3, a block diagram of a monitoring device 300 is shown in accordance with an illustrative embodiment. Monitoring device 300 may include a second input interface 302, a second output interface 304, a second communication interface 306, a second non-transitory computer-readable medium 308, a second processor 310, a monitoring application 322, segmentation model description 126, an image dataset 324, and a predicted image class dataset 326. Fewer, different, and/or additional components may be incorporated into monitoring device 300.

Second input interface 302 provides the same or similar functionality as that described with reference to input interface 102 of segmentation model training device 100 though referring to monitoring device 300. Second output interface 304 provides the same or similar functionality as that described with reference to output interface 104 of segmentation model training device 100 though referring to monitoring device 300. Second communication interface 306 provides the same or similar functionality as that described with reference to communication interface 106 of segmentation model training device 100 though referring to monitoring device 300. Data and messages may be transferred between monitoring device 300 and a distributed computing system 328 using second communication interface 306. Distributed computing system 128 and distributed computing system 328 may be the same or different computing systems. Second computer-readable medium 308 provides the same or similar functionality as that described with reference to computer-readable medium 108 of segmentation model training device 100 though referring to monitoring device 300. Second processor 310 provides the same or similar functionality as that described with reference to processor 110 of segmentation model training device 100 though referring to monitoring device 300.

Monitoring application 322 may be integrated with other system processing tools to automatically process data received through second input interface 302 and/or second communication interface 306 generated as part of operation of an enterprise, device, system, facility, etc. to monitor the images that may be output using second output interface 304 and/or second communication interface 306 so that appropriate action can be initiated in response to changes in the monitored images.

Monitoring application 322 performs operations associated with classifying or predicting a characteristic value related to each image included in image dataset 324. The predicted characteristic value may be stored in predicted image class dataset 326 to support various data analysis functions as well as provide alert/messaging related to each classification. Dependent on the type of images stored in training dataset 124 and/or image dataset 324, monitoring application 322 may identify anomalies or defects as part of process control, for example, of a manufacturing process. Some or all of the operations described herein may be embodied in monitoring application 322. The operations may be implemented using hardware, firmware, software, or any combination of these methods.

One or more operations of monitoring application 322 further may be performed by an ESPE on an event stream instead of reading observation vectors from image dataset 324 as described further below. Monitoring application 322 and segmentation model training application 122 may be the same or different applications that are integrated in various manners to train a segmentation model using training dataset 124 that may be distributed on distributed computing system 128 and to execute the trained segmentation model to predict the characteristic of each observation vector included in image dataset 324 that may be distributed on distributed computing system 328.

Training dataset 124 and image dataset 324 may be generated, stored, and accessed using the same or different mechanisms. No mask image has been defined for the images stored in image dataset 324 unlike training dataset 124. Similar to training dataset 124, image dataset 324 may include a plurality of rows and a plurality of columns with the plurality of rows referred to as observations. Image dataset 324 may be transposed.

Similar to training dataset 124, image dataset 324 may be stored on second computer-readable medium 308 or on one or more computer-readable media of distributed computing system 328 and accessed by monitoring device 300 using second communication interface 306. Data stored in image dataset 324 may be an image, for example, from an image sensor 313 that is the same as or similar to sensor 113. The images stored in image dataset 324 may be captured at different time points periodically, intermittently, when an event occurs, etc. One or more columns may include a time value or other parameter used to assist in classification of one or more objects captured in each image. Similar to training dataset 124, data stored in image dataset 324 may be generated as part of the IoT, and some or all data may be pre- or post-processed by an ESPE.

Similar to training dataset 124, image dataset 324 may be stored in various compressed formats such as a coordinate format, a compressed sparse column format, a compressed sparse row format, etc. Image dataset 324 further may be stored using various structures as known to those skilled in the art including a file system, a relational database, a system of tables, a structured query language database, etc. on monitoring device 300 and/or on distributed computing system 328. Though the term dataset is used herein, the term is not intended to refer to a particular type of data structure for storing data with images.

Monitoring device 300 may coordinate access to image dataset 324 that is distributed across a plurality of computing devices that make up distributed computing system 328. For example, image dataset 324 may be stored in a cube distributed across a grid of computers as understood by a person of skill in the art. As another example, image dataset 324 may be stored in a multi-node Hadoop® cluster. As another example, image dataset 324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in image dataset 324.

Referring to FIGS. 4A and 4B, example operations associated with monitoring application 322 are described. Additional, fewer, or different operations may be performed depending on the embodiment. The order of presentation of the operations of FIGS. 4A and 4B is not intended to be limiting. A user can interact with one or more user interface windows presented to the user in a display under control of monitoring application 322 independently or through a browser application in an order selectable by the user. Although some of the operational flows are presented in sequence, the various operations may be performed in various repetitions, concurrently, and/or in other orders than those that are illustrated. For example, a user may execute monitoring application 322, which causes presentation of a first user interface window, which may include a plurality of menus and selectors such as drop-down menus, buttons, text boxes, hyperlinks, etc. associated with monitoring application 322 as understood by a person of skill in the art. As further understood by a person of skill in the art, various operations may be performed in parallel, for example, using a plurality of threads or a plurality of computing devices such as a grid or a cloud of computing devices.

In an operation 400, a tenth indicator may be received that indicates segmentation model description 126. For example, the tenth indicator indicates a location and a name of segmentation model description 126. As an example, the tenth indicator may be received by monitoring application 322 after selection from a user interface window or after entry by a user into a user interface window. In an alternative embodiment, segmentation model description 126 may not be selectable. For example, most recently trained model configuration data may be used automatically. As another example, segmentation model description 126 may be provided automatically as part of integration with segmentation model training application 122.

In an operation 402, a segmentation model description is read from segmentation model description 126.

In an operation 404, a segmentation model is instantiated with the segmentation model description. For example, the architecture of the neural network model, its hyperparameters, its weight vector, and other characterizing elements are read and used to instantiate the segmentation model based on the information output from the training process in operation 264.

In an operation 406, an eleventh indicator may be received that indicates one or more object extremum criteria. For example, the one or more object extremum criteria may include a maximum horizontal number of pixels in the x-axis direction and/or a maximum vertical number of pixels in the y-axis direction that define a size of the monitored object. As another option, the one or more object extremum criteria may include a maximum number of pixels in a diagonal direction.

In an operation 408, a twelfth indicator may be received that indicates image cropping criteria. For example, the image cropping criteria may be the same as or similar to those indicated in operation 202.

In an operation 410, a thirteenth indicator may be received that indicates image resizing criteria. For example, the image resizing criteria may be the same as those indicated in operation 204.

In an operation 412, a fourteenth indicator may be received that indicates one or more polygon exclusion parameters. For example, the one or more polygon exclusion parameters may indicate one or more criterion to exclude polygons entirely contained within another polygon, to exclude polygons that enclose a predefined number of pixels, etc. For example, a polygon may be excluded if it encloses less than or equal to 100 pixels. One or more criteria may be defined using the one or more polygon exclusion parameters.

In an operation 414, a fifteenth indicator may be received that indicates one or more polygon classification parameters. For example, the one or more polygon classification parameters may indicate one or more criteria to apply to classify a polygon as one of the predefined classes. For example, a polygon is classified as defective based on a percentage of pixels enclosed by the polygon labeled as defective. For illustration, a polygon may be classified as defective when greater than or equal to a predefined classification threshold are classified as defective by the segmentation model. For example, the predefined classification threshold may be 50% of the pixels enclosed by the polygon. As another example, the polygon may be classified as defective when the number of pixels included in the polygon classified in the defective object class is greater than or equal to the number of pixels included in the polygon classified in the non-defective object class.

In an operation 416, a sixteenth indicator may be received that indicates one or more polygon aggregation parameters. The one or more polygon aggregation parameters may indicate one or more criteria to apply to classify a polygon as one of the predefined classes when the classifications are aggregated over time. For example, a polygon may be tracked over time and classified as part of processing of images that include the polygon. Subsequently, the polygon may be classified as a different class. The one or more polygon aggregation parameters indicate how to classify a polygon over time. For example, a polygon aggregation parameter may indicate that the polygon is classified based on a classification assigned during a predefined time window or in a predefined number of previous images. For illustration, a polygon may be classified as defective when at least 50% of the images processed over the previous three seconds indicate that the polygon is defective. As another illustration, a polygon may be classified as defective when at least three out of five of the most recent images indicate that the polygon is defective.

In an operation 418, a seventeenth indicator may be received that indicates one or more zone parameters. The one or more zone parameters may indicate one or more zones defined within each image. For example, a zone may indicate different processing areas within the area being monitored such as different sections of a conveyor belt. Each zone may be defined by a polygon defined in the pixel space that indicates an area in the image that includes each respective zone. The one or more zone parameters may define one or more zones having the same or different shapes, sizes, orientations, etc. in the image.

In an operation 420, an observation vector is received by being read from image dataset 324, received from a computing device of distributed computing system 328, received from image sensor 313, etc.

Similar to operation 216, in an operation 422, the received image is cropped based on the image cropping criteria indicated in operation 408. For example, the predefined number of pixels are removed in each direction as indicated by the image cropping criteria.

Similar to operation 218, in an operation 424, the received image cropped in operation 422 are resized based on the image resizing criteria indicated in operation 410.

In an operation 426, the resized, cropped image is input to the instantiated segmentation model to classify each pixel in the resized, cropped image into one of the predefined classes. Again, the predefined classes may include background class, non-defective object class, and defective object class, where the defective object class may include a plurality of sub-classes to more specifically indicate a defect in the object.

In an operation 428, the classified pixels are grouped to define polygons based on whether the pixel is labeled as a background pixel or not a background pixel even if the pixels may be further classified differently such as defective or non-defective. For example, some non-background pixels may be classified as defective in a respective polygon while others may be classified as non-defective. The polygons define boundaries for a contiguous group of non-background pixels. As a result, an exterior of each polygon includes background pixels.

In an operation 430, the one or more polygon exclusion parameters indicated in operation 406 are applied to each polygon defined in operation 428 to remove any polygons that satisfy the one or more polygon exclusion criteria defined by the one or more polygon exclusion parameters.

In an operation 432, the one or more object extremum criteria such as the maximum horizontal number of pixels and/or the maximum vertical number of pixels are applied to each polygon defined in operation 428 to split any polygon meeting the one or more object extremum criteria into at least two polygons based on the criteria. For example, a polygon that has a width that exceeds the maximum horizontal number of pixels may be split into two polygons at the maximum horizontal number of pixels from a right edge or a left edge of the polygon depending on the criterion. Because the polygons may have a height in the vertical direction also, the polygon further may be split in the vertical direction.

In an operation 434, the one or more polygon classification parameters are applied to each polygon defined after splitting any polygon based on the one or more object extremum criteria to classify each polygon based on the predefined classes excluding the background class which has already been separated from the polygons in operation 428. Again, as an example, the predefined classes may include a defective object class and a non-defective object class. For illustration, each polygon may be classified as defective if greater than or equal to 50% of the pixels enclosed by the respective polygon are classified as defective. Otherwise, the polygon is classified as non-defective. Each polygon is associated with an object being monitored in the received image. The defective object class may include a plurality of sub-classes that further indicate a type of defective object such as a cracked object class and a broken object class.

In operation 436, a determination is made concerning whether objects in the images are moving in successive images. For example, objects are moving in successive images when the object is positioned on a conveyor belt that is moving the object. When the images are moving, processing continues in an operation 440 shown referring to FIG. 4B. When the images are not moving, processing continues in an operation 450 shown referring to FIG. 4B. If the received image is the first image, processing further may continue in operation 450.

In operation 440, an axis aligned bounding box is defined for each polygon using the coordinates of each respective polygon as defined by the grouped pixels. Each axis aligned bounding box is rectangular and aligned with the x-y coordinate system defined by the image. For example, each image includes a predefined number of pixels in the x-direction and a predefined number of pixels in the y-direction. The predefined number of pixels in the x-direction may be equal to the predefined number of pixels in the y-direction. The predefined number of pixels in the x-direction may define rows of pixels where a number of the rows is the predefined number of pixels in the y-direction. The y-direction is perpendicular to the x-direction, and the x-direction and the y-direction define a pixel coordinate system. The extrema in the x-direction and in the y-direction for each polygon may be used to define the corners of each axis aligned bounding box.

A centroid is defined for each axis aligned bounding box based on the x-direction and the y-direction extent of the axis aligned bounding box. The defined axis aligned bounding box and the centroid are associated with the respective polygon. The centroid provides a simpler representation of a location of each polygon.

In an operation 442, the polygon(s) defined in a most recent iteration of operation 432 (or operation 430 if the polygon was not split) are compared to the polygon(s) defined in a previous iteration of operation 432 to identify which polygon(s) defined in the most recent iteration of operation 432 represent the same polygon as one of those defined in the previous iteration of operation 432. For example, an intersection over union algorithm may be applied to determine how much overlap or intersection there is between each polygon defined in the most recent iteration of operation 432 and each polygon defined in the previous iteration of operation 432. A polygon defined in the previous iteration of operation 432 having a highest percentage overlap that exceeds a predefined overlap threshold may be identified as the same polygon as the polygon defined in the most recent iteration of operation 432. The predefined overlap threshold may be defined based on a speed of movement of each object and a number of images per second that are generated by image sensor 313.

In an operation 444, a unique polygon identifier is assigned to each polygon defined in the most recent iteration of operation 432. Polygons identified as the same polygon in operation 442 are assigned the unique polygon identifier already assigned to the polygon in a previous iteration of operation 442. Polygons for which no polygon was identified as having a sufficient overlap based on the predefined overlap threshold are assigned a new polygon identifier. For example, a next polygon identifier may be maintained as polygons are identified and compared. The next polygon identifier may be assigned to a polygon for which no polygon was identified as having a sufficient overlap.

In an operation 446, each polygon defined in the most recent iteration of operation 432 may be classified based on the one or more polygon aggregation parameters indicated in operation 416. For example, a polygon may be classified as defective when at least 50% of the images processed over the previous three seconds indicate that the polygon is defective; otherwise, the polygon is indicated as non-defective irrespective of the classification in operation 434. If the polygon has not been monitored the predefined amount of time or number of images, a most recent classification in operation 434 may be used.

In an operation 448, a zone location is determined for each polygon defined in the most recent iteration of operation 432 based on the one or more zone parameters indicated in operation 418. For example, the centroid determined for each axis aligned bounding box defined for each respective polygon is compared with the polygon defined in the pixel space for each zone to determine within which zone the centroid is located. The determined zone is associated with the respective polygon.

In operation 450, the polygon classification information is output. For example, the polygon classification information is presented on display 316, written to predicted image class dataset 326, sent to another computing device of distributed computing system 328, etc. For each polygon defined in the most recent iteration of operation 432, the polygon classification information may include the unique polygon identifier assigned in operation 444 to the respective polygon, a time that the image was captured, the classification of the polygon defined for the respective polygon in either operation 434 or operation 446, the zone in which the respective polygon is located based on the determination in operation 448, etc. The time may include a date. The polygon classification information may further include a list of the zero or more polygons included in each zone with the respective classification.

In an operation 452, a determination is made concerning whether there is another image received or included in image dataset 324. When there is another image, processing continues in operation 420 to process the next image. When there is not another image, processing continues in an operation 454.

In operation 454, processing is stopped.

Figure 17:
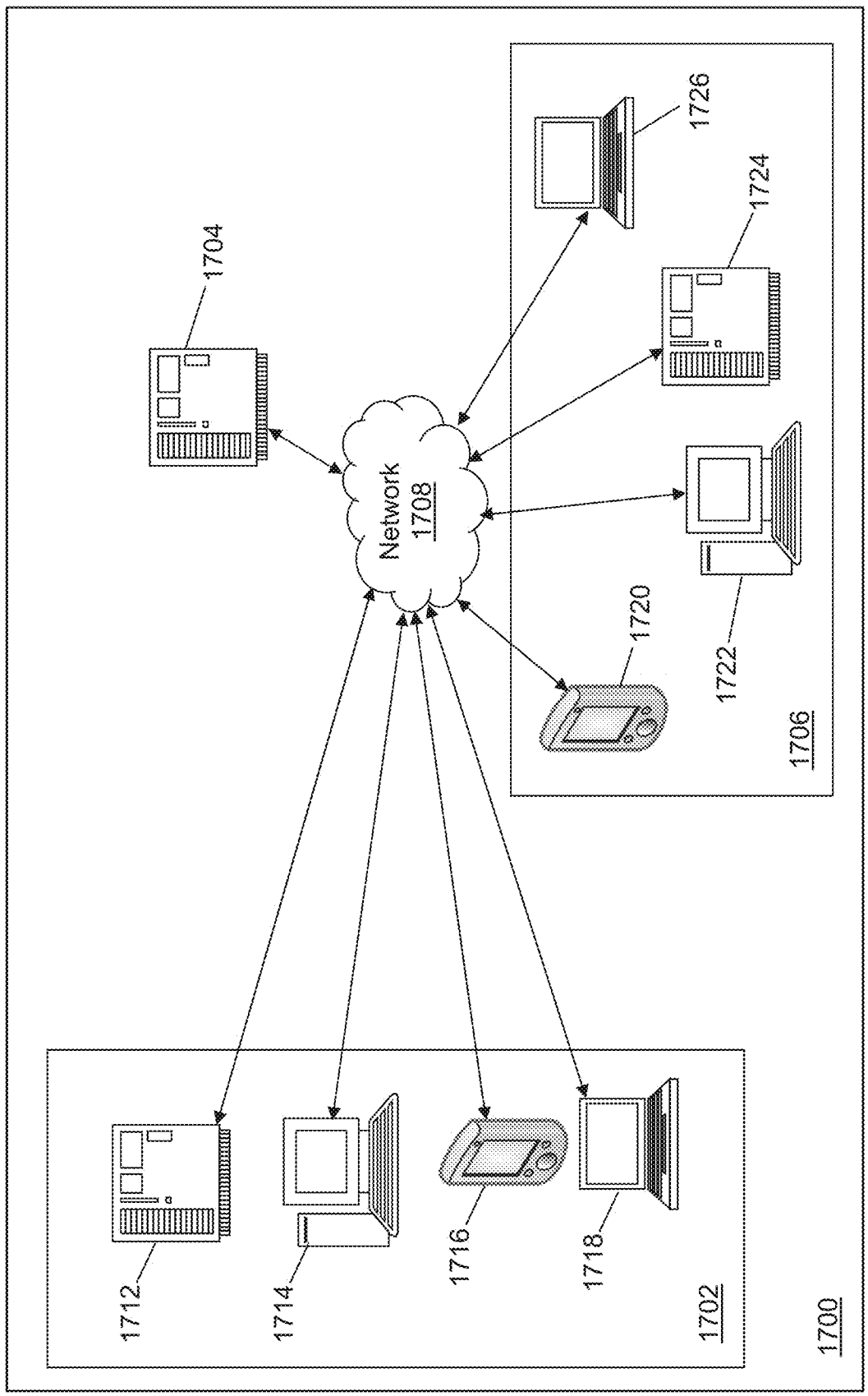
FIG. 17 depicts a block diagram of an event stream processing (ESP) system in accordance with an illustrative embodiment.

One or more operations of monitoring application 322 further may be performed by an ESPE. Referring to FIG. 17, a block diagram of a stream processing system 1700 is shown in accordance with an illustrative embodiment. In an illustrative embodiment, stream processing system 1700 may include an event publishing system 1702, an ESP device 1704, an event subscribing system 1706, and a network 1708. Each of event publishing system 1702, ESP device 1704 and event subscribing system 1706 may be composed of one or more discrete devices in communication through network 1708.

Event publishing system 1702 publishes a measurement data value to ESP device 1704 as an "event". An event is a data record that reflects a state of a system or a device. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An "Upsert" opcode updates the event object if a key field already exists, otherwise, the event object is inserted. ESP device 1704 receives the measurement data value in an event stream, processes the measurement data value, and identifies a computing device of event subscribing system 1706 to which the processed measurement data value is sent.

Network 1708 may include one or more networks of the same or different types. Network 1708 can be any type of wired and/or wireless public or private network including a cellular network, a local area network, a wide area network such as the Internet or the World Wide Web, etc. Network 1708 further may comprise sub-networks and consist of any number of communication devices.

Figure 5:
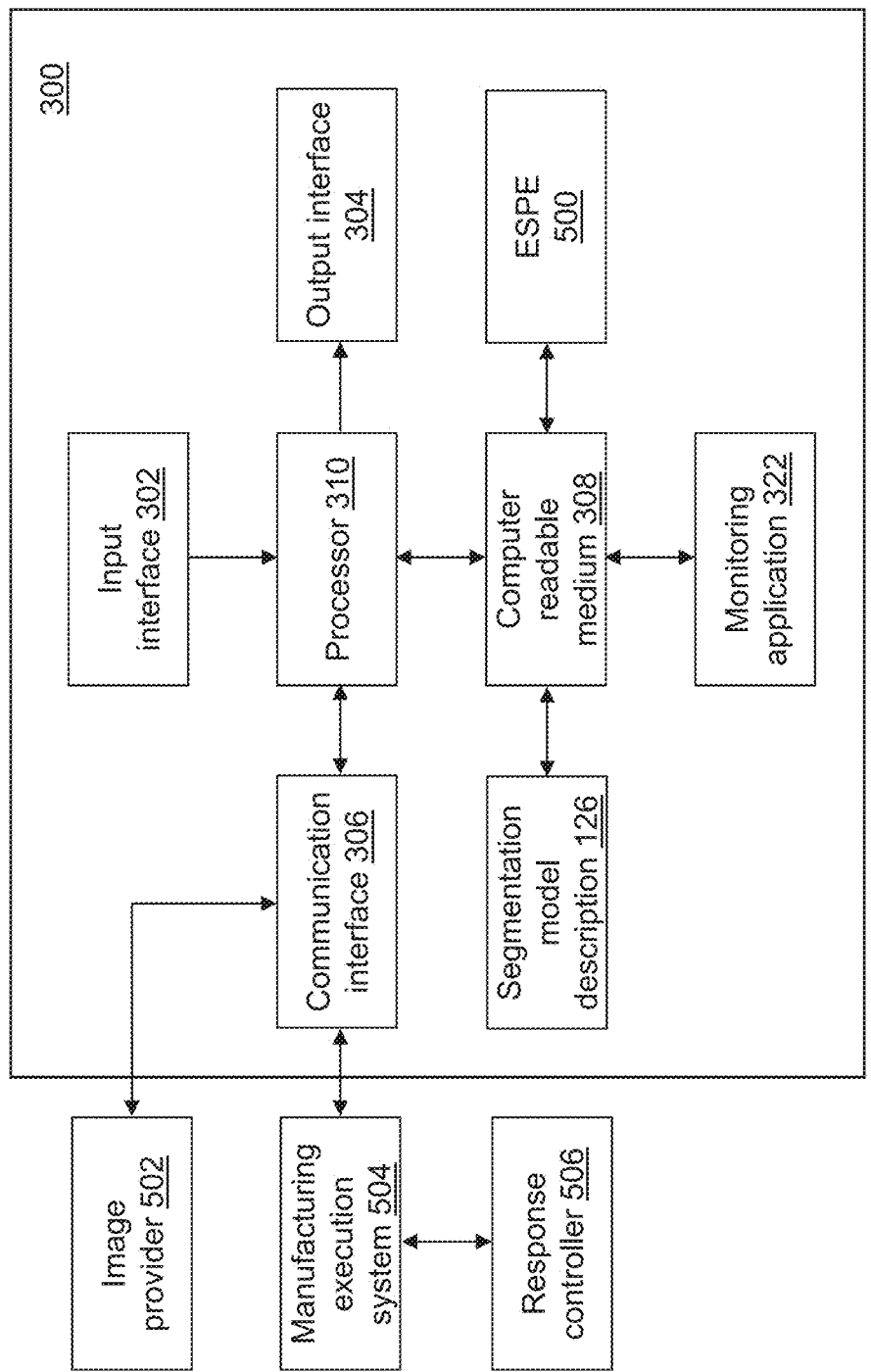
FIG. 5 depicts a block diagram of the monitoring device of FIG. 3 executing an event stream processing (ESP) engine (ESPE) device of an ESP system of FIG. 17 in accordance with an illustrative embodiment.

ESP device 1704 can include any form factor of computing device. For illustration, FIG. 17 represents ESP device 1704 as a server computer. In general, a server computer may include faster processors, additional processors, more disk memory, and/or more RAM than a client computer and support multi-threading as understood by a person of skill in the art. ESP device 1704 sends and receives signals through network 1708 to/from event publishing system 1702 and/or to/from event subscribing system 1706. ESP device 1704 may communicate using various transmission media that may be wired and/or wireless as understood by those skilled in the art. ESP device 1704 may be implemented on a plurality of computing devices of the same or different type that may support failover processing. monitoring For example, referring to FIG. 5, a block diagram of monitoring device 300 is shown in accordance with an illustrative embodiment, where monitoring device 300 is also operating as ESP device 1704. Monitoring device 300 may further include an ESPE 500 instantiated as part of execution of monitoring application 322.

Data and messages including event block objects included in a data stream may be transferred between monitoring device 300 and event publishing system 1702 or event subscribing system 1706 using second communication interface 306. In the illustrative embodiment, event publishing system 1702 includes an image provider 502 that is providing images to monitoring device 300, and event subscribing system 1706 includes a manufacturing execution system 504 to which monitoring device 300 provides some or all of the polygon classification information. Manufacturing execution system 504 may communicate with a response controller 506 that may execute a response as a result of receipt of some or all of the polygon classification information.

The one or more computing devices of event publishing system 1702 may include computing devices of any form factor such as a server computer 1712, a desktop 1714, a smart phone 1716, a laptop 1718, a personal digital assistant, an integrated messaging device, a tablet computer, an IoT device, etc. Event publishing system 1702 can include any number and any combination of form factors of computing devices that may be organized into subnets. The computing devices of event publishing system 1702 send and receive signals through network 1708 to/from another of the one or more computing devices of event publishing system 1702 and/or to/from ESP device 1704. The one or more computing devices of event publishing system 1702 may communicate using various transmission media that may be wired and/or wireless as understood by those skilled in the art. The one or more computing devices of event publishing system 1702 may be geographically dispersed from each other and/or co-located. Each computing device of the one or more computing devices of event publishing system 1702 may be executing one or more event publishing applications such as an event publishing application 822 (shown referring to FIG. 8) of the same or different type.

The one or more computing devices of event subscribing system 1706 may include computers of any form factor such as a smart phone 1720, a desktop 1722, a server computer 1724, a laptop 1726, a personal digital assistant, an integrated messaging device, a tablet computer, etc. Event subscribing system 1706 can include any number and any combination of form factors of computing devices. The computing devices of event subscribing system 1706 send and receive signals through network 1708 to/from ESP device 1704. The one or more computing devices of event subscribing system 1706 may be geographically dispersed from each other and/or co-located. The one or more computing devices of event subscribing system 1706 may communicate using various transmission media that may be wired and/or wireless as understood by those skilled in the art. Each computing device of the one or more computing devices of event subscribing system 1706 may be executing one or more event subscribing applications such as an event subscribing application 1022 (shown referring to FIG. 10) of the same or different type.

Event publishing system 1702 publishes a measurement data value to ESP device 1704 as an "event". An event is a data record that reflects a state of a system or a device. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An "Upsert" opcode updates the event object if a key field already exists, otherwise, the event object is inserted. ESP device 1704 receives the measurement data value in an event stream, processes the measurement data value, and identifies a computing device of event subscribing system 1706 to which the processed measurement data value is sent.

Network 1708 may include one or more networks of the same or different types. Network 1708 can be any type of wired and/or wireless public or private network including a cellular network, a local area network, a wide area network such as the Internet or the World Wide Web, etc. Network 1708 further may comprise sub-networks and consist of any number of communication devices.

The one or more computing devices of event subscribing system 1706 may include computers of any form factor such as a smart phone 1720, a desktop 1722, a server computer 1724, a laptop 1726, a personal digital assistant, an integrated messaging device, a tablet computer, etc. Event subscribing system 1706 can include any number and any combination of form factors of computing devices. The computing devices of event subscribing system 1706 send and receive signals through network 1708 to/from ESP device 1704. The one or more computing devices of event subscribing system 1706 may be geographically dispersed from each other and/or co-located. The one or more computing devices of event subscribing system 1706 may communicate using various transmission media that may be wired and/or wireless as understood by those skilled in the art. Each computing device of the one or more computing devices of event subscribing system 1706 may be executing one or more event subscribing applications such as an event subscribing application 1022 (shown referring to FIG. 10) of the same or different type.

Figure 6:
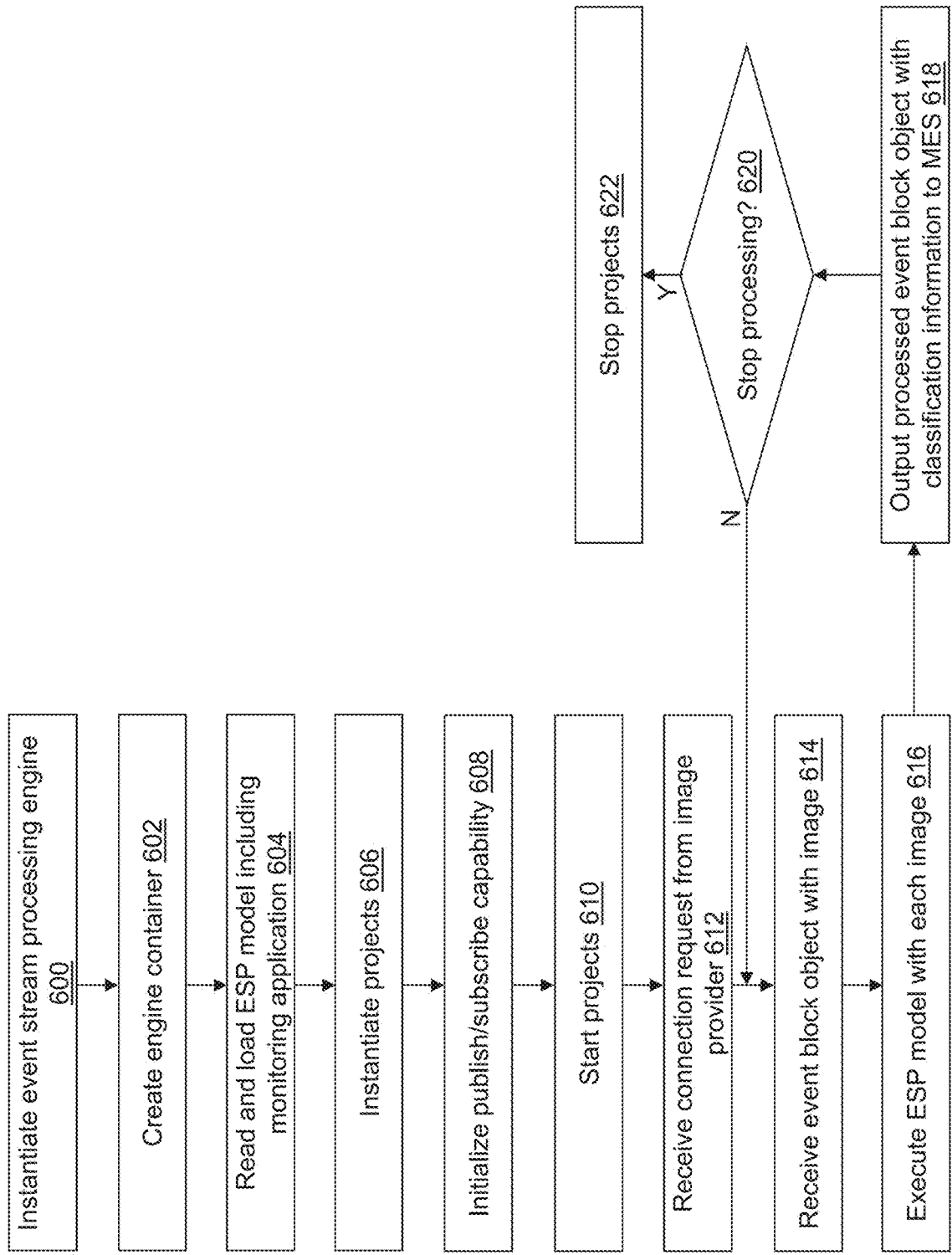
FIG. 6 depicts a flow diagram illustrating examples of operations performed by the monitoring device of FIG. 5 in accordance with an illustrative embodiment.

Referring to FIG. 6, a flow diagram illustrating example operations associated with monitoring application 322 modified to instantiate ESPE 500 is shown in accordance with an illustrative embodiment. Additional, fewer, or different operations may be performed depending on the embodiment of monitoring application 322. The order of presentation of the operations of FIG. 6 is not intended to be limiting. Although some of the operational flows are presented in sequence, the various operations may be performed in various repetitions, concurrently (in parallel, for example, using threads), and/or in other orders than those that are illustrated.

Figure 7:
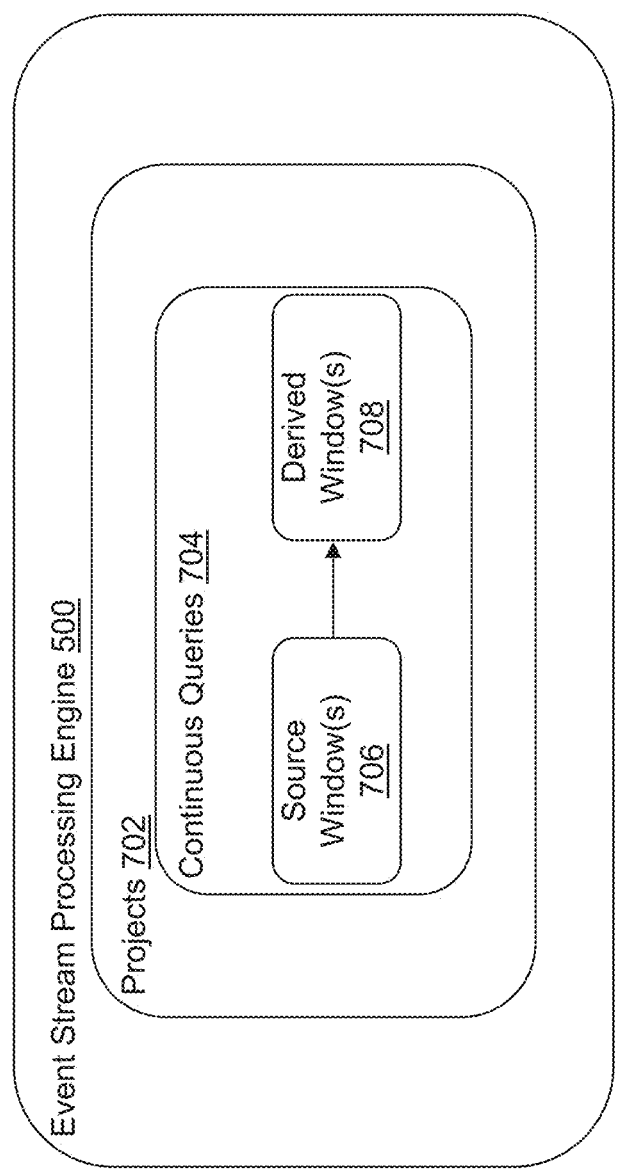
FIG. 7 depicts a block diagram of an ESP engine executing on the monitoring device of FIG. 5 in accordance with an illustrative embodiment.

In an operation 500, ESPE 500 is instantiated. For example, referring to FIG. 7, the components of ESPE 500 executing at monitoring device 300 are shown in accordance with an illustrative embodiment. ESPE 500 may include one or more projects 702. A project may be described as a second-level container in an engine model managed by ESPE 500 where a thread pool size for the project may be defined by a user. A value of one for the thread pool size indicates that writes are single-threaded. Each project of the one or more projects 702 may include one or more continuous queries 704 that contain data flows, which are data transformations of incoming event streams. The one or more continuous queries 704 may include one or more source windows 706 and one or more derived windows 708.

The engine container is the top-level container in a model that manages the resources of the one or more projects 702. Each ESPE 500 has a unique engine name. Additionally, the one or more projects 702 may each have unique project names, and each query may have a unique continuous query name and begin with a uniquely named source window of the one or more source windows 706. Each ESPE 500 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 706 and the one or more derived windows 708 represent continuously executing queries that generate updates to a query result set as new event blocks stream through ESPE 500. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 500 can support the opcodes for events including insert, update, upsert, and delete. As a result, events entering a source window of the one or more source windows 706 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, a partial-update, or a retention generated event from retention policy management, and one or more microsecond timestamps. For example, the one or more microsecond timestamps may indicate a sensor data generation time, a data receipt time by image provider 502, a data transmit time by image provider 502, a data receipt time by monitoring device 300, etc.

An event block object may be described as a grouping or package of one or more event objects. An event stream may be described as a flow of event block objects. A continuous query of the one or more continuous queries 704 transforms the incoming event stream made up of streaming event block objects published into ESPE 500 into one or more outgoing event streams using the one or more source windows 706 and the one or more derived windows 708. A continuous query can also be thought of as data flow modeling. One or more of the operations of FIGS. 4A and 4B may be implemented by the continuous query of the one or more continuous queries 704.

The one or more source windows 706 are at the top of the directed graph and have no windows feeding into them. Event streams are published into the one or more source windows 706 by event publishing system 306, and from there, the event streams are directed to the next set of connected windows as defined by the directed graph.

The one or more derived windows 708 are all instantiated windows that are not source windows and that have other windows streaming events into them. The one or more derived windows 708 perform computations or transformations on the incoming event streams. The one or more derived windows 708 transform event streams based on the window type (that is operators such as join, filter, compute, aggregate, copy, pattern match, procedural, union, etc.) and window settings. As event streams are published into ESPE 500, they are continuously queried, and the resulting sets of derived windows in these queries are continuously updated.

Referring again to FIG. 6, in an operation 602, the engine container is created. For illustration, ESPE 500 may be instantiated using a function call that specifies the engine container as a manager for the model. The function call may include the engine name for ESPE 500 that may be unique to ESPE 500.

In an operation 604, an ESP model that may be stored locally to second computer-readable medium 308 is read and loaded. The ESP model includes a definition of the one or more projects 702. For example, the ESP model includes a definition of aspects of monitoring application 322 that are defined to process each event block object. For illustration, one or more of the operations of FIGS. 4A and 4B are implemented using the one or more source windows 706 and the one or more derived windows 708 that are connected for the flow of data as defined in the one or more continuous queries 704.

In an operation 606, the one or more projects 702 defined by the ESP model are instantiated. Instantiating the one or more projects 702 also instantiates the one or more continuous queries 704, the one or more source windows 706, and the one or more derived windows 708 defined from the ESP model. Based on the ESP model, ESPE 500 may analyze and process events in motion or event streams. Instead of storing events and running queries against the stored events, ESPE 500 may store queries and stream events through them to allow continuous analysis of data as it is received. The one or more source windows 706 and the one or more derived windows 708 defined from the ESP model may be created based on the relational, pattern matching, and procedural algorithms that transform input event streams into output event streams.

In an operation 608, the pub/sub capability is initialized for ESPE 500. In an illustrative embodiment, the pub/sub capability is initialized for each project of the one or more projects 702. To initialize and enable pub/sub capability for ESPE 500, a host name and a port number are provided. The host name and the port number of ESPE 500 may be read from the ESP model. Pub/sub clients can use the host name and the port number of monitoring device 300 to establish pub/sub connections to ESPE 500. For example, a server listener socket is opened for the port number to enable event publishing system 1702 and/or event subscribing system 1706 to connect to ESPE 500 for pub/sub services. The host name and the port number of monitoring device 300 to establish pub/sub connections to ESPE 500 may be referred to as the host:port designation of ESPE 500 executing on monitoring device 300.

Pub/sub is a message-oriented interaction paradigm based on indirect addressing. Processed data recipients (event subscribing system 1706) specify their interest in receiving information from ESPE 500 by subscribing to specific classes of events, while information sources (event publishing system 1702) publish events to ESPE 500 without directly addressing the data recipients.

In an operation 610, the one or more projects 702 defined from the ESP model are started. The one or more started projects may run in the background on monitoring device 300.

In an operation 612, a connection request is received from image provider 502 for a source window to which data will be published. A connection request further is received from a computing device of event subscribing system 1706, for example, from image provider 502 that is an event subscribing device.

In an operation 614, an event block object is received from image provider 502. An event block object containing one or more event objects is injected into a source window of the one or more source windows 706 defined from the ESP model. The event block object may include one or more images captured by image sensor 313 to which image provider 502 is connected. Each time a new event block object is received into the source window, the appropriate data within the received event block object is extracted for processing.

In an operation 616, the received event block object is processed through the one or more continuous queries 704. For example, the one or more continuous queries 704 may be designed to process each image as described by operations 422 through 450 of FIGS. 4A and 4B as images are extracted from event block objects. The unique ID assigned to the event block object by image provider 502 may be maintained as the event block object is passed through ESPE 500 and between the one or more source windows 706 and/or the one or more derived windows 708 of ESPE 500. A unique embedded transaction ID further may be embedded in the event block object as the event block object is processed by a continuous query. ESPE 500 maintains the event block containership aspect of the received event blocks from when the event block is published into a source window and works its way through the directed graph defined by the one or more continuous queries 704 with the various event translations before being output to manufacturing execution system 504 in the illustrative embodiment.

In an operation 618, the processed event block object is output to one or more subscribing devices of event subscribing system 1706 such as manufacturing execution system 504. An output from the one or more continuous queries 704 may be some or all of the polygon classification information output in operation 450.

Manufacturing execution system 504 can correlate a group of subscribed event block objects back to a group of published event block objects by comparing the unique ID of the event block object that a publisher, such as image provider 502, attached to the event block object with the event block ID received by manufacturing execution system 504. The received event block objects further may be stored, for example, in a RAM or cache type memory of second computer-readable medium 308.

In an operation 620, a determination is made concerning whether or not processing is stopped. If processing is not stopped, processing continues in operation 614 to continue receiving the one or more event streams containing event block objects from image provider 502. If processing is stopped, processing continues in an operation 622.

In operation 622, the started projects may be stopped, and ESPE 500 may be shutdown.

Figure 8:
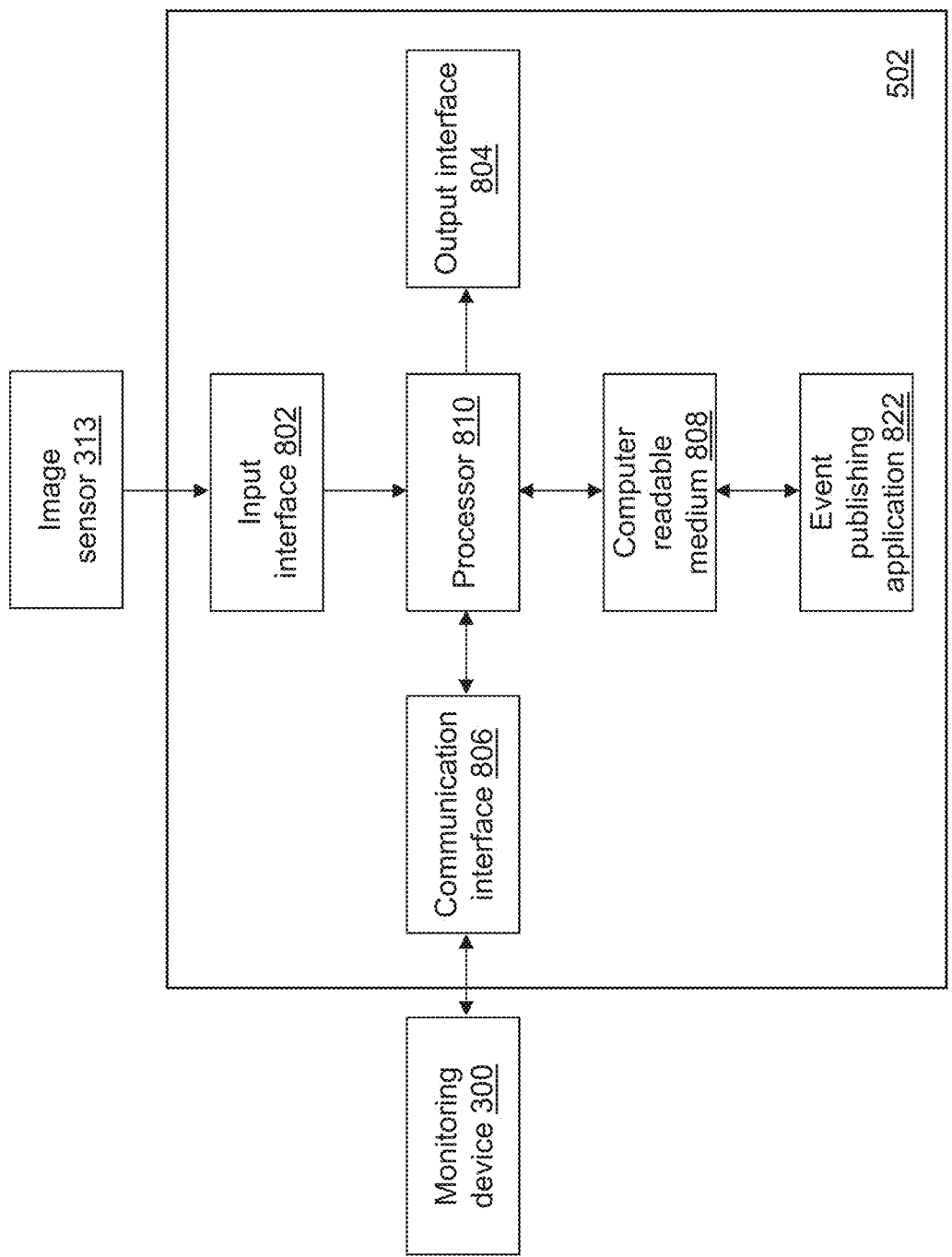
FIG. 8 depicts a block diagram of an event publishing device of an event publishing system of the ESP system of FIG. 17 in accordance with an illustrative embodiment.

Referring to FIG. 8, a block diagram of image provider 502 of event publishing system 1702 is shown in accordance with an example embodiment. Image provider 502 is an example computing device of event publishing system 1702. For example, each of server computer 1712, desktop 1714, smart phone 1716, and laptop 1718 may be an instance of image provider 502. Image provider 502 may include a third input interface 802, a third output interface 804, a third communication interface 806, a third computer-readable medium 808, a third processor 810, and event publishing application 822. Each image provider 502 of event publishing system 1702 may include the same or different components and combinations of components. Fewer, different, and additional components may be incorporated into image provider 502. Event publishing system 1702 includes, is integrated with, and/or communicates with image sensor 313. Image sensor 313 may be connected to image provider 502 through third input interface 802 or third communication interface 806.

Third input interface 802 provides the same or similar functionality as that described with reference to input interface 102 of segmentation model training device 100 though referring to image provider 502. Third output interface 804 provides the same or similar functionality as that described with reference to output interface 104 of segmentation model training device 100 though referring to image provider 502. Third communication interface 806 provides the same or similar functionality as that described with reference to communication interface 106 of segmentation model training device 100 though referring to image provider 502. Data and messages may be transferred between image provider 502 and monitoring device 300 using third communication interface 806. Third computer-readable medium 808 provides the same or similar functionality as that described with reference to computer-readable medium 108 of segmentation model training device 100 though referring to image provider 502. Third processor 810 provides the same or similar functionality as that described with reference to processor 110 of segmentation model training device 100 though referring to image provider 502.

Event publishing application 822 performs operations associated with generating, capturing, and/or receiving an image from image sensor 313 and publishing the image in an event stream to monitoring device 300. The operations may be implemented using hardware, firmware, software, or any combination of these methods. Referring to the example embodiment of FIG. 8, event publishing application 822 is implemented in software (comprised of computer-readable and/or computer-executable instructions) stored in third computer-readable medium 808 and accessible by third processor 810 for execution of the instructions that embody the operations of event publishing application 822. Event publishing application 822 may be written using one or more programming languages, assembly languages, scripting languages, etc. Event publishing application 822 may be implemented as a Web application.

Figure 9:
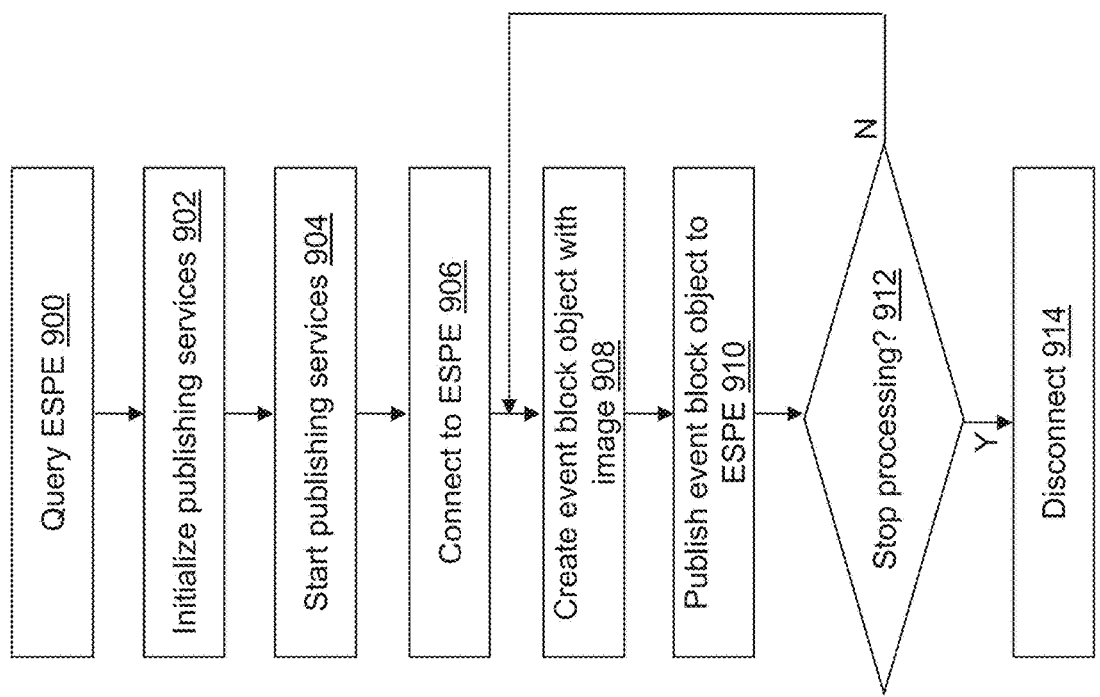
FIG. 9 depicts a flow diagram illustrating examples of operations performed by the event publishing device of FIG. 8 in accordance with an illustrative embodiment.

Referring to FIG. 9, example operations associated with event publishing application 822 are described. Additional, fewer, or different operations may be performed depending on the embodiment. The order of presentation of the operations of FIG. 9 is not intended to be limiting. A user can interact with one or more user interface windows presented to the user in a display under control of event publishing application 822 independently or through a browser application in an order selectable by the user. Although some of the operational flows are presented in sequence, the various operations may be performed in various repetitions, concurrently, and/or in other orders than those that are illustrated. For example, a user may execute event publishing application 822, which causes presentation of a first user interface window, which may include a plurality of menus and selectors such as drop-down menus, buttons, text boxes, hyperlinks, etc. associated with event publishing application 822 as understood by a person of skill in the art. As further understood by a person of skill in the art, various operations may be performed in parallel, for example, using a plurality of threads or a plurality of computing devices such as a grid or a cloud of computing devices.

In an operation 900, ESPE 500 is queried, for example, to discover projects 702, continuous queries 704, windows 706, 808, window schema, and window edges currently running in ESPE 500. The engine name and host/port to ESPE 500 may be provided as an input to the query and a list of strings may be returned with the names of the projects 702, of the continuous queries 704, of the windows 706, 808, of the window schema, and/or of the window edges of currently running projects on ESPE 500. The host is associated with a host name or Internet Protocol (IP) address of ESP device 1704. The port is the port number provided when a publish/subscribe (pub/sub) capability is initialized by ESPE 500. The engine name is the name of ESPE 500. The engine name of ESPE 500 and host/port to monitoring device 300 may be read from a storage location on third computer-readable medium 808, may be provided on a command line, or otherwise input to or defined by event publishing application 822 as understood by a person of skill in the art.

In an operation 902, publishing services are initialized.

In an operation 904, the initialized publishing services are started, which may create a publishing client for the instantiated event publishing application 822. The publishing client performs the various pub/sub activities for the instantiated event publishing application 822. For example, a string representation of a URL to ESPE 500 is passed to a "Start" function. For example, the URL may include the host:port designation of ESPE 500 executing at monitoring device 300, a project of the projects 702, a continuous query of the continuous queries 704, and a window of the source windows 706. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 822 is publishing to more than one source window of ESPE 500, the initialized publishing services may be started to each source window using the associated names (project name, continuous query name, source window name).

In an operation 906, a connection is made between event publishing application 822 and ESPE 500 for each source window of the source windows 706 to which any measurement data value is published. To make the connection, the pointer to the created publishing client may be passed to a "Connect" function. If event publishing application 822 is publishing to more than one source window of ESPE 500, a connection may be made to each started window using the pointer returned for the respective "Start" function call.

In an operation 908, an event block object is created by event publishing application 822 that includes one or more images and any other data to be sent to monitoring device 300. The images may have been received, captured, generated, etc., for example, through third communication interface 806 or third input interface 802 or by third processor 810. The one or more images and any other data may be processed before inclusion in the event block object, for example, to change a unit of measure, convert to a different reference system, etc. The event block object may include one or more images captured at different times and/or by different devices. For example, a plurality of image sensors 313 may provide images to image provider 502.

In an operation 910, the created event block object is published to ESPE 500, for example, using the pointer returned for the respective "Start" function call to the appropriate source window. Event publishing application 822 passes the created event block object to the created publishing client, where the unique ID field in the event block object has been set by event publishing application 822 possibly after being requested from the created publishing client. In an illustrative embodiment, event publishing application 822 may wait to begin publishing until a "Ready" callback has been received from the created publishing client. The event block object is injected into the source window, continuous query, and project associated with the started publishing client.

In an operation 912, a determination is made concerning whether or not processing is stopped. If processing is not stopped, processing continues in operation 908 to continue creating and publishing event block. If processing is stopped, processing continues in an operation 914.

In operation 914, the connection made between event publishing application 822 and ESPE 500 through the created publishing client may be disconnected, and each started publishing client may be stopped.

Figure 10:
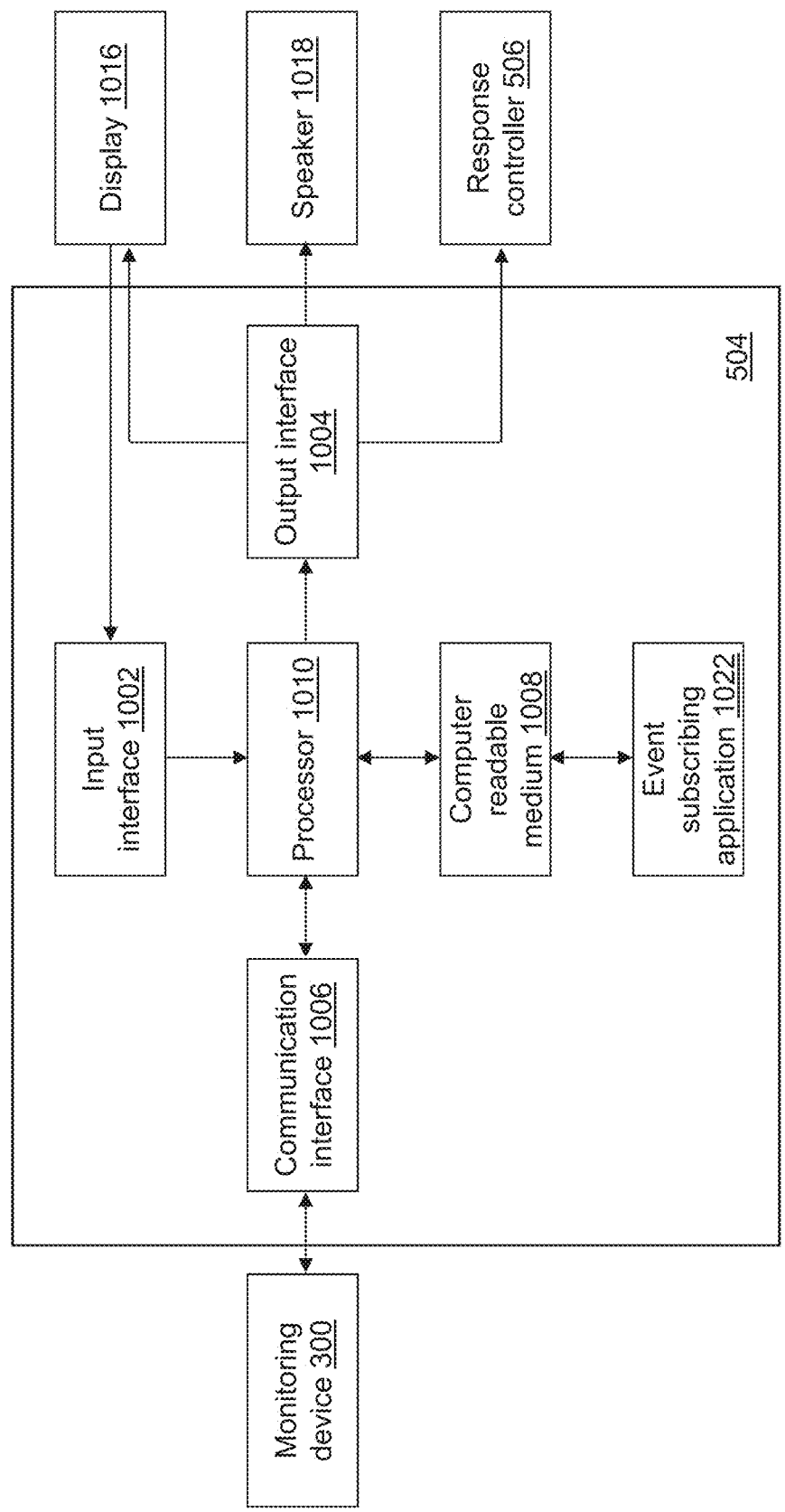
FIG. 10 depicts a block diagram of an event subscribing device of an event subscribing system of the ESP system of FIG. 17 in accordance with an illustrative embodiment.

Referring to FIG. 10, a block diagram of manufacturing execution system 504 is shown in accordance with an example embodiment. Manufacturing execution system 504 is an example computing device of event subscribing system 1706. For example, each of smart phone 1720, desktop 1722, server computer 1724, and laptop 1726 may be an instance of manufacturing execution system 504. Manufacturing execution system 504 may include a fourth input interface 1002, a fourth output interface 1004, a fourth communication interface 1006, a fourth computer-readable medium 1008, a fourth processor 1010, and event subscribing application 1022. Fewer, different, and additional components may be incorporated into manufacturing execution system 504. Each manufacturing execution system 504 of event subscribing system 1706 may include the same or different components or combination of components.

Fourth input interface 1002 provides the same or similar functionality as that described with reference to input interface 102 of segmentation model training device 100 though referring to manufacturing execution system 504. Fourth output interface 1004 provides the same or similar functionality as that described with reference to output interface 104 of segmentation model training device 100 though referring to manufacturing execution system 504. Fourth communication interface 1006 provides the same or similar functionality as that described with reference to communication interface 106 of segmentation model training device 100 though referring to manufacturing execution system 504. Data and messages may be transferred between manufacturing execution system 504 and monitoring device 300 using fourth communication interface 1006. Fourth computer-readable medium 1008 provides the same or similar functionality as that described with reference to computer-readable medium 108 of segmentation model training device 100 though referring to manufacturing execution system 504. Fourth processor 1010 provides the same or similar functionality as that described with reference to processor 110 of segmentation model training device 100 though referring to manufacturing execution system 504.

Figure 11:
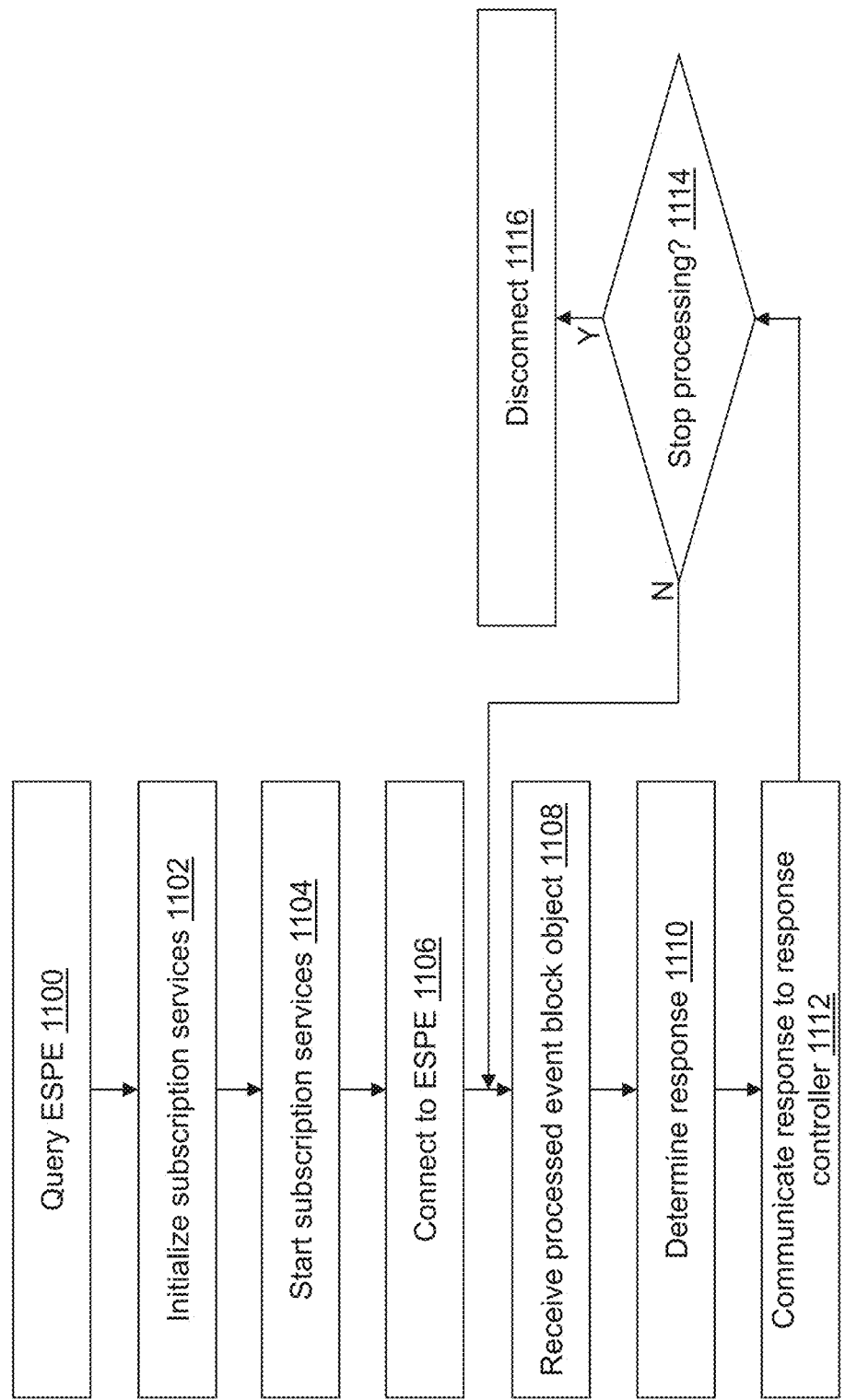
FIG. 11 depicts a flow diagram illustrating examples of monitoring operations performed by the event subscribing device of FIG. 10 in accordance with an illustrative embodiment.

Referring to FIG. 11, example operations associated with event subscribing application 1022 are described. Additional, fewer, or different operations may be performed depending on the embodiment. The order of presentation of the operations of FIG. 1 is not intended to be limiting.

Similar to operation 900, in an operation 1100, ESPE 500 is queried, for example, to discover names of projects 702, of continuous queries 704, of windows 706, 808, of window schema, and of window edges currently running in ESPE 500. The host name of monitoring device 300, the engine name of ESPE 500, and the port number opened by ESPE 500 are provided as an input to the query and a list of strings may be returned with the names to the projects 702, continuous queries 704, windows 706, 808, window schema, and/or window edges.

In an operation 1102, subscription services are initialized.

In an operation 1104, the initialized subscription services are started, which may create a subscribing client on behalf of event subscribing application 1022 at manufacturing execution system 504. The subscribing client performs the various pub/sub activities for event subscribing application 1022. For example, a URL to ESPE 500 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1106, a connection may be made between event subscribing application 1022 executing at manufacturing execution system 504 and ESPE 500 through the created subscribing client. To make the connection, the pointer to the created subscribing client may be passed to a "Connect" function and a mostly non-busy wait loop created to wait for receipt of event block objects.

In an operation 1108, the processed event block object is received by event subscribing application 1022 executing at manufacturing execution system 504 as a result of operation 618.

In an operation 1110, the received event block object is processed based on the operational functionality provided by event subscribing application 1022. For example, event subscribing application 1022 may determine a response to take based on the polygon classification information extracted from the received event block object. For example, the response may be to remove a defective object from the conveyor belt.

In an operation 1112, the determined response may be communicated to response controller 506. For example, the defective object may be routed to a different location because it is defective. As another example, an alarm or alert may be generated for a human to remove the defective object. The alarm or alert may be presented on second display 1016, broadcast over second speaker 1018, sent to another computing device such as a phone, etc.

In an operation 1114, a determination is made concerning whether or not processing is stopped. If processing is not stopped, processing continues in operation 1108 to continue receiving and processing event block objects. If processing is stopped, processing continues in an operation 1116.

In operation 1116, the connection made between event subscribing application 1022 and ESPE 500 through the subscribing client may be disconnected, and the subscribing client may be stopped.

Figure 12A:
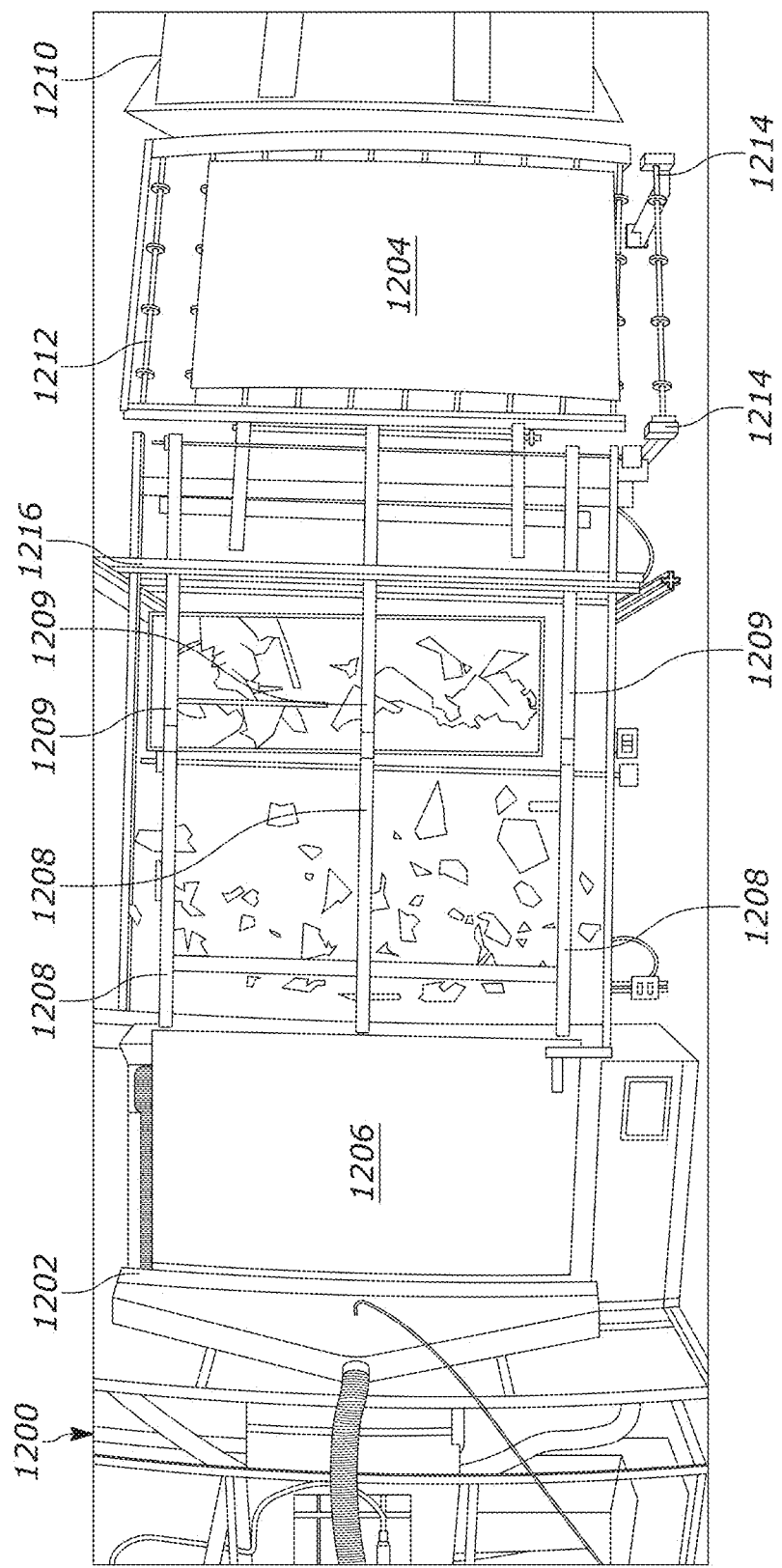
FIG. 12A shows an image of a monitored portion of a manufacturing line at a first time in accordance with an illustrative embodiment.

For illustration, monitoring device 300 may be incorporated into a manufacturing system that manufactures solar panels. Referring to FIG. 12A, a first image 1200 is shown that was captured at a first time in accordance with an illustrative embodiment. First image 1200 captures a portion of the manufacturing line that includes an oven exit 1202, a first conveyor belt 1208, a second conveyor belt 1209, a dumpster 1210, a bidirectional conveyor belt 1212, a third conveyor belt 1214, and a line scanner 1216. At the first time, a first solar panel 1204 and a second solar panel 1206 are on the portion of the manufacturing line. First solar panel 1204 exited the oven previously and is now positioned on bidirectional conveyor belt 1212. Second solar panel 1206 has just exited the oven and is positioned on an oven conveyor belt (not shown). Each solar panel exits the oven on the left and, as the solar panel moves onto and over first conveyor belt 1208, second conveyor belt 1209, and bidirectional conveyor belt 1212, the solar panel may break due to temperature variations and other factors.

Line scanner 1216 is an existing broken glass detector positioned to scan each solar panel as it travels below it. Line scanner 1216 scans the solar panel and determines whether the panel is broken or not just prior to each solar panel reaching bidirectional conveyor belt 1212. Manufacturing execution system 504 receives the indicator of a broken panel from line scanner 1216. When a broken panel is detected, manufacturing execution system 504 communicates a command to response controller 506 to route the panel into dumpster 1210 rather than onto second conveyor belt 1214 that continues the manufacturing process. In the illustrative embodiment, response controller 506 controls a direction of movement of bidirectional conveyor belt 1212 to either route each panel to the right into dumpster 1210 or downward onto second conveyor belt 1214.

Figure 12B:
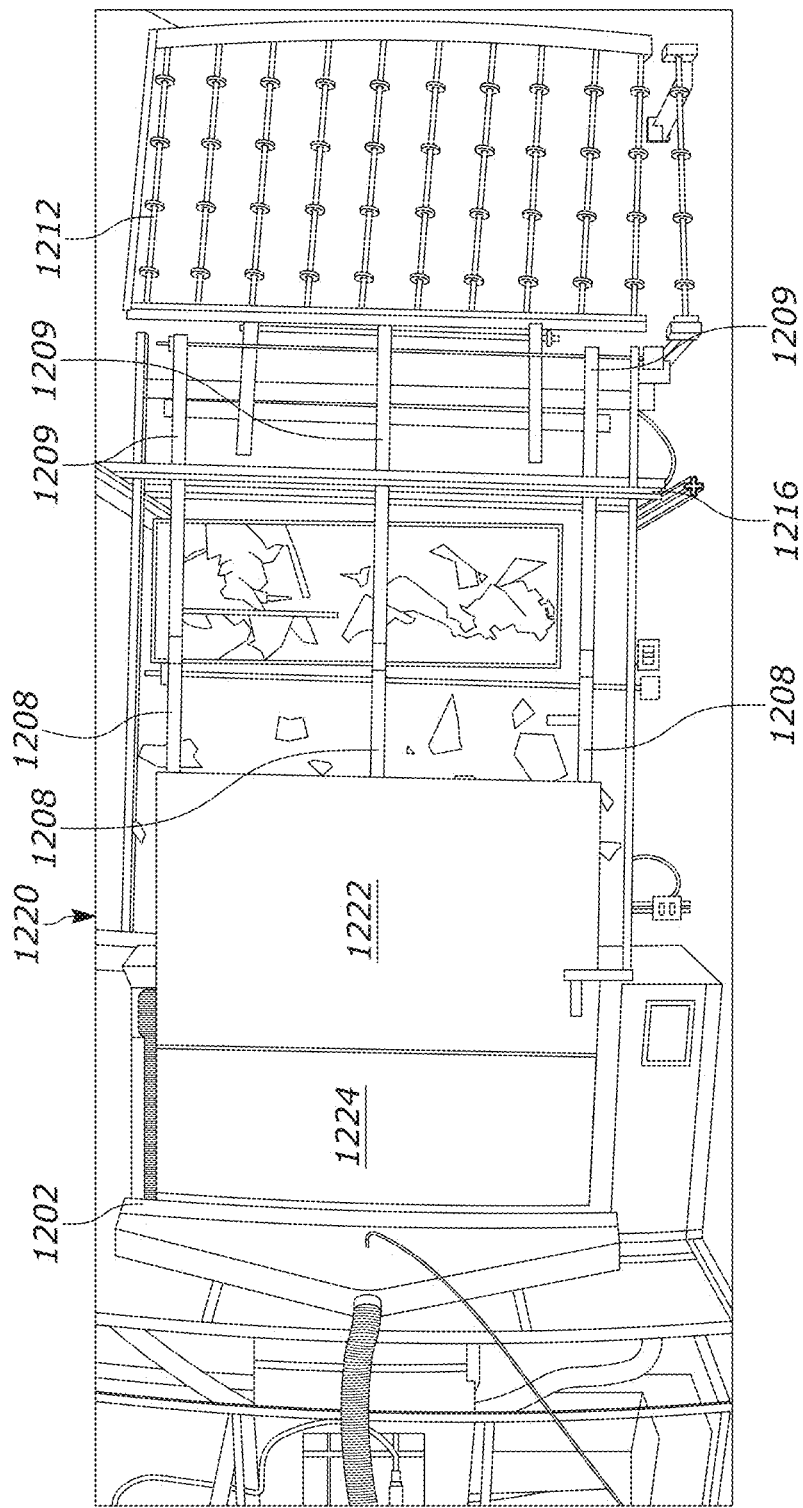
FIG. 12B shows an image of the monitored portion of the manufacturing line at a second time in accordance with an illustrative embodiment.

Referring to FIG. 12B, a second image 1220 is shown that was captured at a second time in accordance with an illustrative embodiment. Second image 1220 includes a third solar panel 1222 and a fourth solar panel 1224. Third solar panel 1222 exited the oven previously and is now positioned partially on the oven conveyor belt and partially on first conveyor belt 1208. Fourth solar panel 1224 is in the process of exiting the oven and is positioned partially under oven exit 1202 and on the oven conveyor belt. Third solar panel 1222 has a crack in the bottom right portion of the panel though the piece has not separated from the remainder of the panel.

Figure 12C:
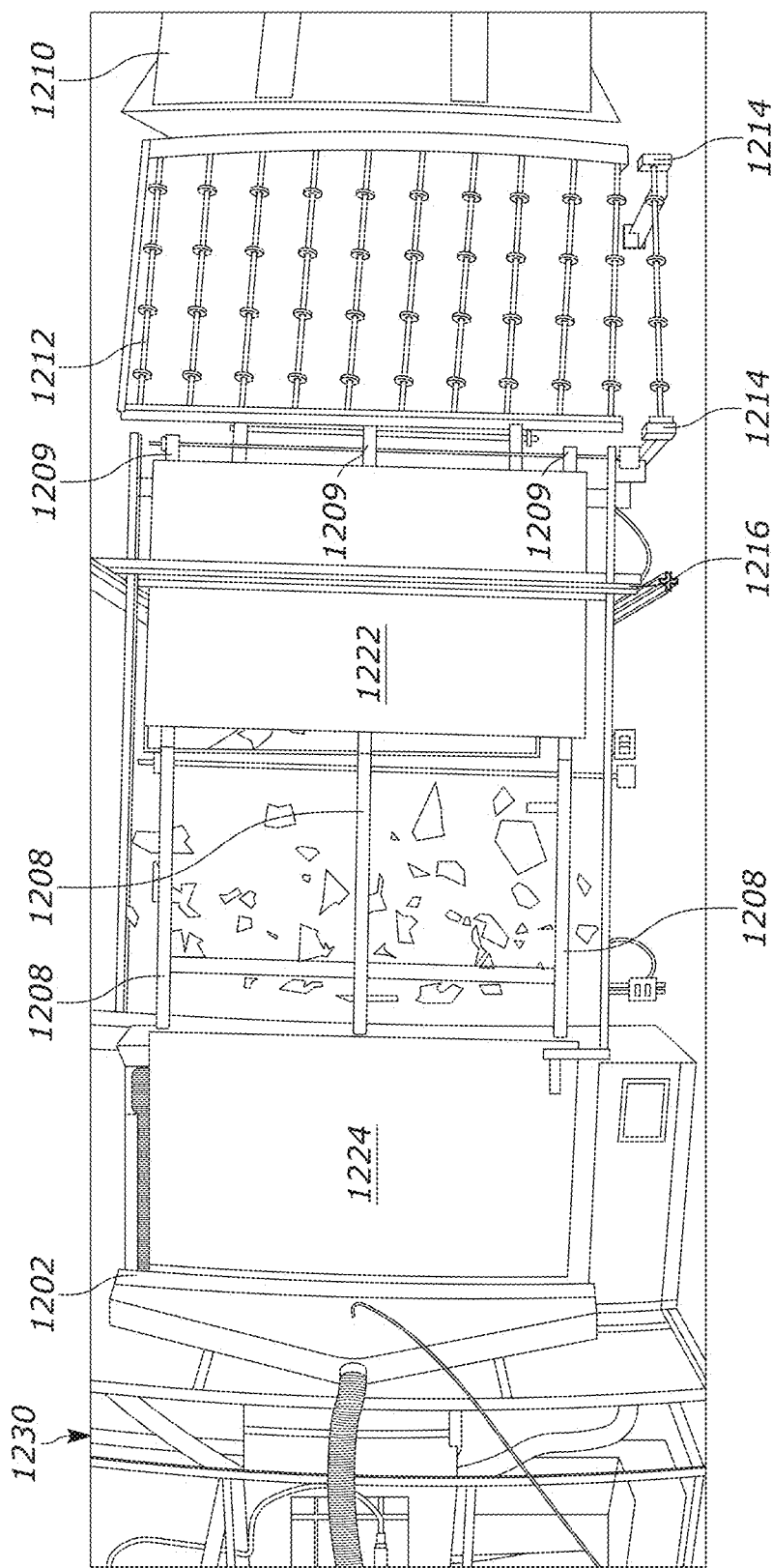
FIG. 12C shows an image of the monitored portion of the manufacturing line at a third time in accordance with an illustrative embodiment.

Referring to FIG. 12C, a third image 1230 is shown that was captured at a third time in accordance with an illustrative embodiment. Third image 1230 includes third solar panel 1222 and fourth solar panel 1224. Third solar panel 1222 is now positioned fully on second conveyor belt 1209. Fourth solar panel 1224 remains in the process of exiting the oven and is positioned on the oven conveyor belt partially under oven exit 1202. The cracked portion of third solar panel 1222 has still not separated from the remainder of the panel even after the cracked portion passed under line scanner 1216.

Figure 12D:
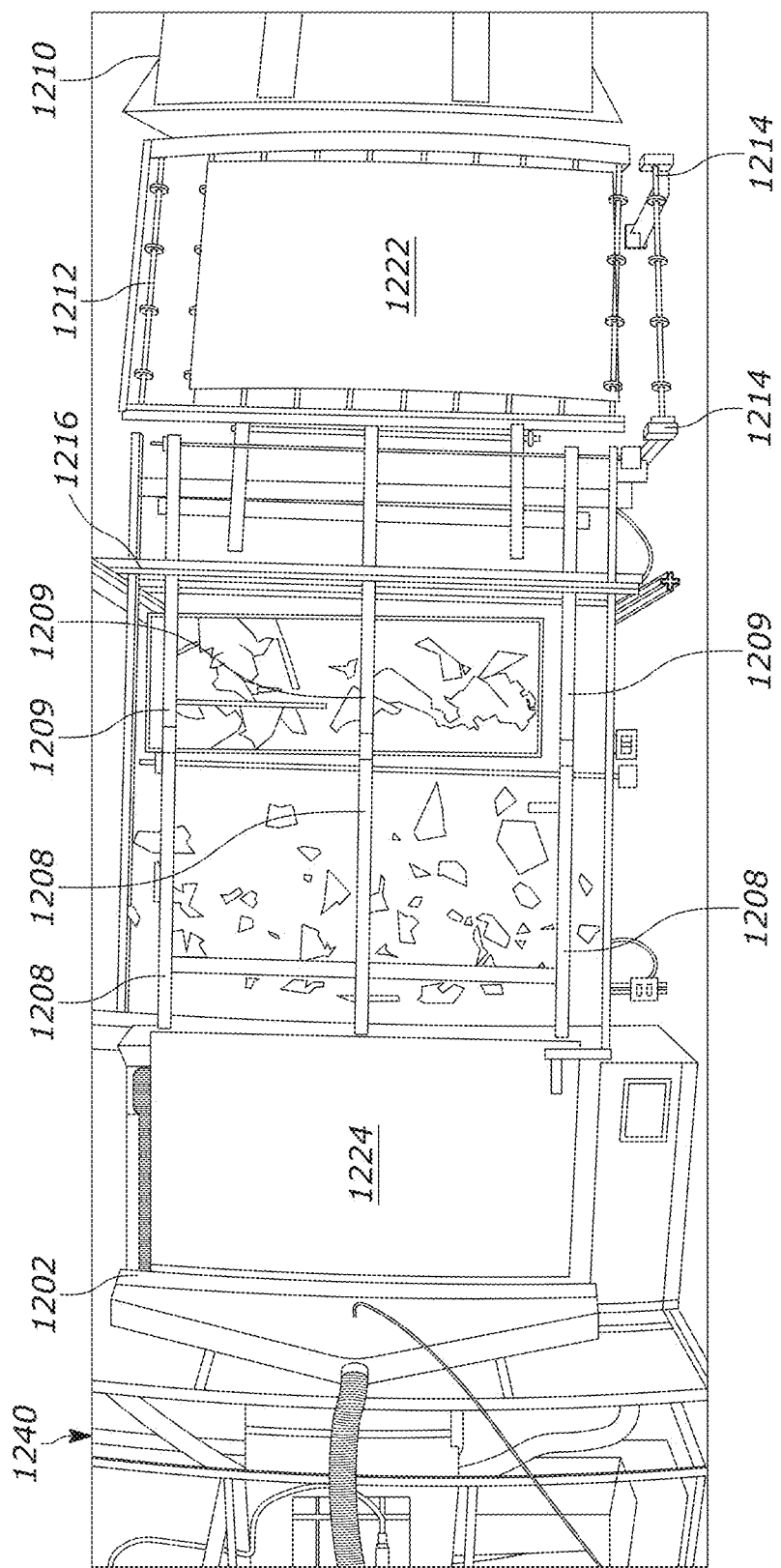
FIG. 12D shows an image of the monitored portion of the manufacturing line at a fourth time in accordance with an illustrative embodiment.

Referring to FIG. 12D, a fourth image 1240 is shown that was captured at a fourth time in accordance with an illustrative embodiment. Fourth image 1240 includes third solar panel 1222 and fourth solar panel 1224. Third solar panel 1222 is now positioned fully on bidirectional conveyor belt 1212. Fourth solar panel 1224 has almost completely exited the oven though fourth solar panel 1224 remains positioned on the oven conveyor belt partially under oven exit 1202. The cracked portion of third solar panel 1222 has now separated from the remainder of the panel after passing under line scanner 1216.

Line scanner 1216 is fixed in place and failed to detect that third solar panel 1222 was broken. The broken panel may become stuck on bidirectional conveyor belt 1212 causing subsequent solar panels to cause a jam. If the operation continues, more solar panels can add to the jam even backing up into the oven. When this occurs, the operations team at the manufacturing facility must shut down the oven, let it cool down, clean out any jammed/broken solar panels, and restart the oven. This can take several hours and have a significant cost to the overall manufacturing production output.

In the illustrative manufacturing line, the oven conveyor belt, first conveyor belt 1208, second conveyor belt 1209, and bidirectional conveyor belt 1212 move the panels at different speeds. For example, the oven conveyor belt moves the panels at a much slower speed than first conveyor belt 1208, second conveyor belt 1209, and bidirectional conveyor belt 1212. As a result, each panel spends a different amount of time on each conveyor belt. Each panel passes under oven exit 1202 slowly as evidenced by the movement of third solar panel 1222 relative to fourth solar panel 1224 between second image 1220 and fourth image 1240. Fourth solar panel 1224 remains on the oven conveyor belt while third solar panel 1222 has moved from the oven conveyor belt across first conveyor belt 1208 and second conveyor belt 1209 and onto bidirectional conveyor belt 1212.

Each conveyor belt may be associated with a distinct zone. The oven conveyor belt may be associated with a first zone. Each solar panel spends approximately W seconds in the first zone. First conveyor belt 1208 may be associated with a second zone. Each solar panel spends approximately X seconds in the second zone. Second conveyor belt 1209 may be associated with a third zone. Each solar panel spends approximately Y seconds in the third zone. Bidirectional conveyor belt 1212 may be associated with a fourth zone. Each solar panel spends approximately Z seconds in the fourth zone.

Monitoring device 300 may detect broken panels from the time each solar panel exits oven exit 1202 until the time each solar panel is fully positioned on bidirectional conveyor belt 1212. Image sensor 313 may be a closed-circuit television (CCTV) camera mounted above the portion of the manufacturing line shown in first image 1200. The CCTV camera captured first image 1200, second image 1220, third image 1230, and fourth image 1240. The CCTV camera is much less expensive than line scanner 1216 and provides a much larger coverage area. The CCTV camera sends the images to monitoring device 300 using a real-time transport protocol (RTSP) stream. Monitoring device 300 can track the solar panel as it transitions from being whole to broken.

Figure 13A:
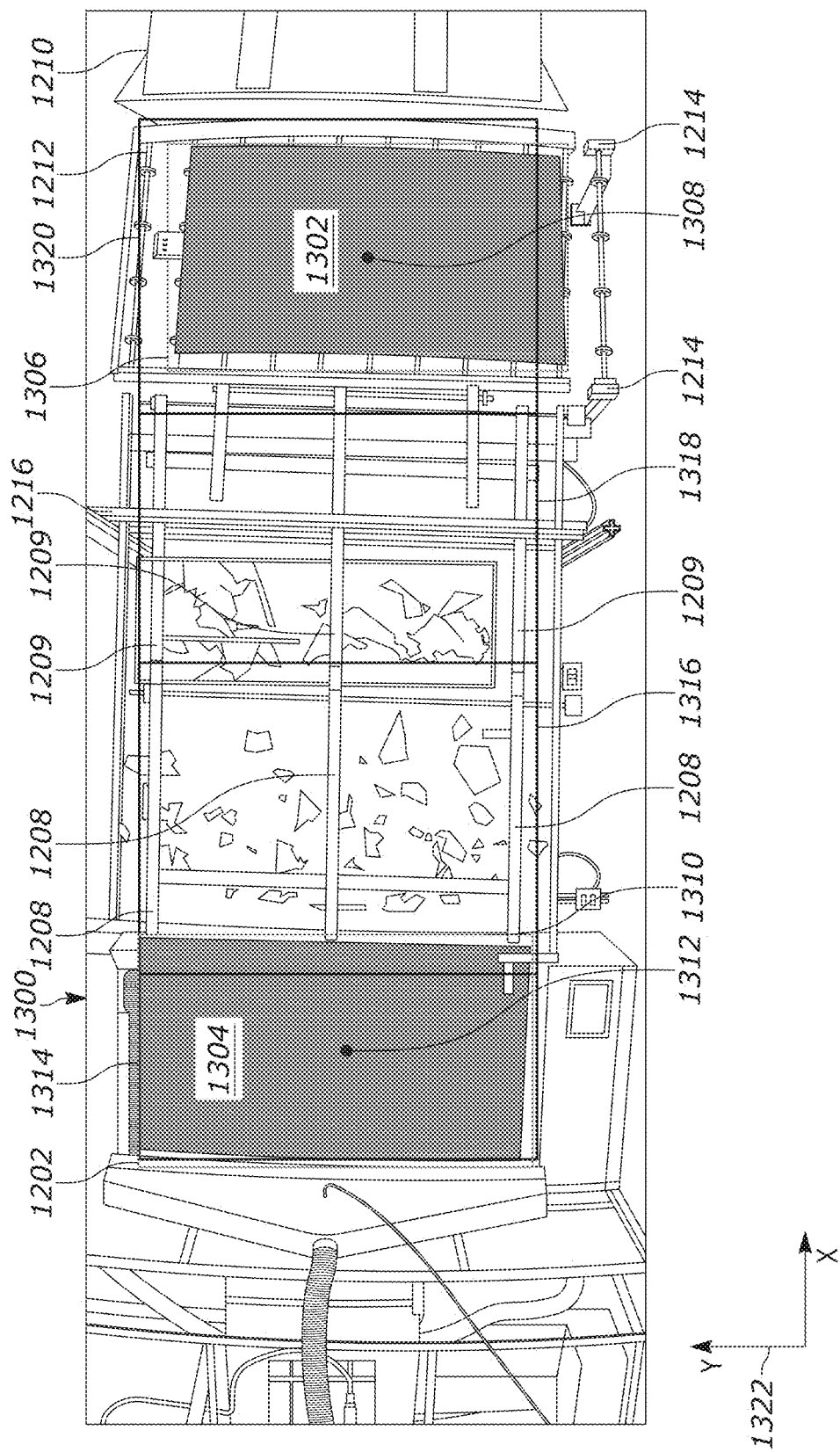
FIG. 13A shows an annotated image of the monitored portion of the manufacturing line at the first time in accordance with an illustrative embodiment.
Figure 13B:
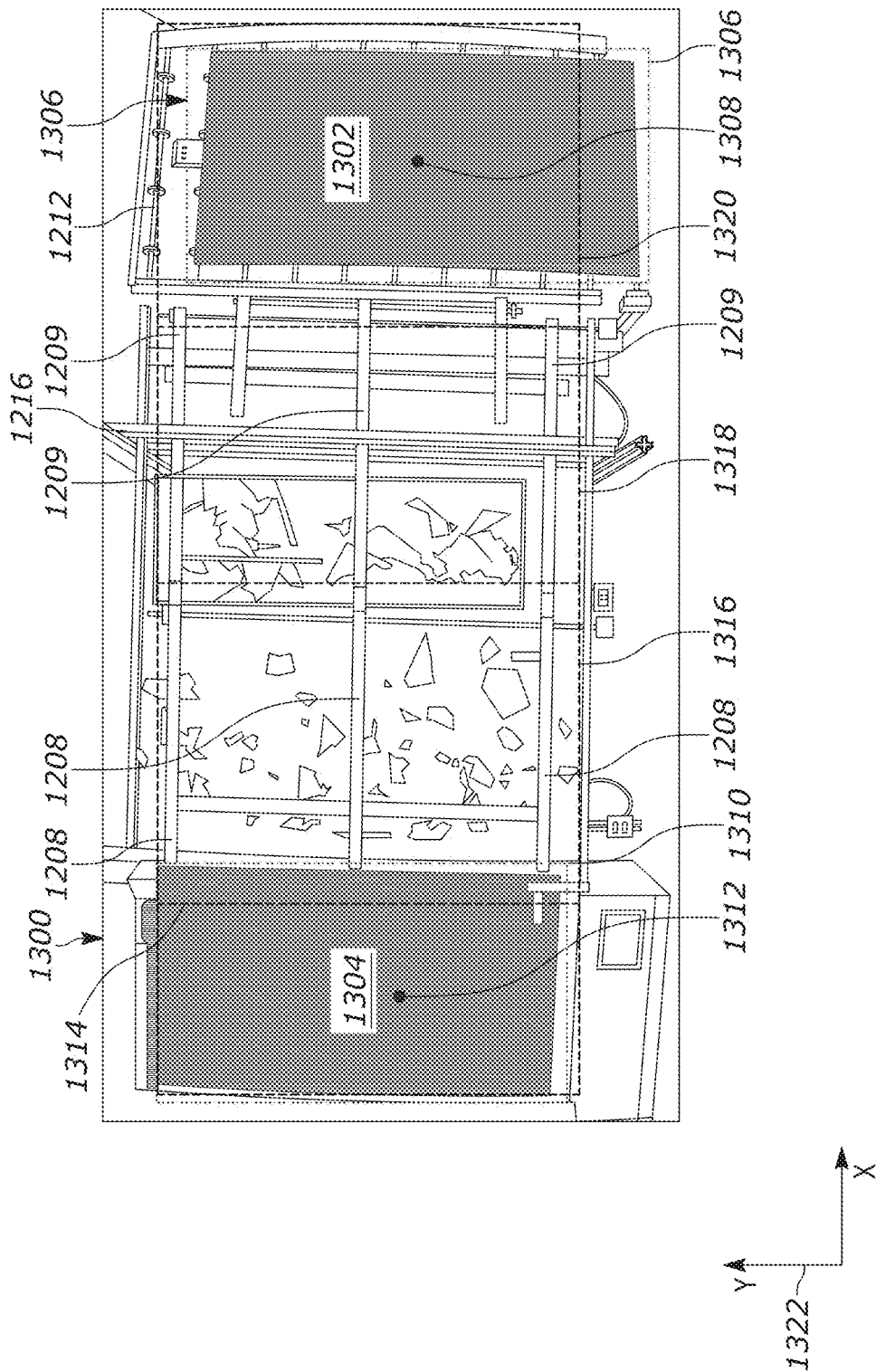
FIG. 13B shows the annotated image of the monitored portion of the manufacturing line at the first time zoomed to show a pair of solar panels on a conveyor belt in accordance with an illustrative embodiment.

Referring to FIG. 13A, a first annotated image 1300 is shown of first image 1200 captured at the first time and shown in FIG. 12A in accordance with an illustrative embodiment. Referring to FIG. 13B, a zoomed view of FIG. 13A is shown that is focused on the conveyor belt portion of first annotated image 1300. First annotated image 1300 includes annotations overlaid on first image 1200. The annotations include a first polygon 1302, a second polygon 1304, a first axis aligned polygon 1306, a first axis aligned polygon centroid 1308, a second axis aligned polygon 1310, a second axis aligned polygon centroid 1312, a first zone 1314, a second zone 1316, a third zone 1318, and a fourth zone 1320. An x-y coordinate system 1322 represents the x-direction and the y-direction of first image 1200 for reference.

First polygon 1302 generally overlays third solar panel 1222, and second polygon 1304 generally overlays fourth solar panel 1224 though the panels are not readily visible because the pixels that make up each polygon overlay the respective panels as expected since the trained segmentation model identified these pixels as non-background pixels. First polygon 1302 and second polygon 1304 were defined after performing operations 422 through 434 on first image 1200 received in operation 420 by monitoring device 300. The pixels are green indicating that third solar panel 1222 and fourth solar panel 1224 were classified as unbroken in operations 434 and 446. The segmentation model was trained with images extracted from training videos and augmented as described in operations 222 through 254. The input images were cropped to the conveyor belt region and resized to 256 by 256 pixels.

First axis aligned polygon 1306, first axis aligned polygon centroid 1308, second axis aligned polygon 1310, and second axis aligned polygon centroid 1312 were defined in operation 440. First axis aligned polygon 1306 and second axis aligned polygon 1310 are aligned with x-y coordinate system 1322. As the solar panels (objects) move along the conveyor belts, the polygon associated with each respective panel is identified and assigned the same panel identifier in operations 442 and 444.

As described previously, first zone 1314, second zone 1316, third zone 1318, and fourth zone 1320 are aligned with different portions of the conveyor belt. The oven conveyor belt is associated with first zone 1314. First conveyor belt 1208 is associated with second zone 1316. Second conveyor belt 1209 is associated with third zone 1318. Bidirectional conveyor belt 1212 is associated with fourth zone 1320. Because the sections of conveyor belt are rectangular, first zone 1314, second zone 1316, third zone 1318, and fourth zone 1320 have rectangular shapes. The shapes are indicated in operation 418 and used to define in which zone each panel is located. Because first axis aligned polygon centroid 1308 is positioned within fourth zone 1320, first polygon 1302 is determined to be in fourth zone 1320 in operation 448. Because second axis aligned polygon centroid 1312 is positioned within first zone 1314, second polygon 1304 is determined to be in first zone 1314 in operation 448.

Each zone may have any other shape and there may be a greater or a fewer number of zones arranged to form different orientations with respect to each other and to have different sizes. For example, other polygonal and/or elliptical shapes in the x-y plane can be defined in alternative embodiments.

Figure 14A:
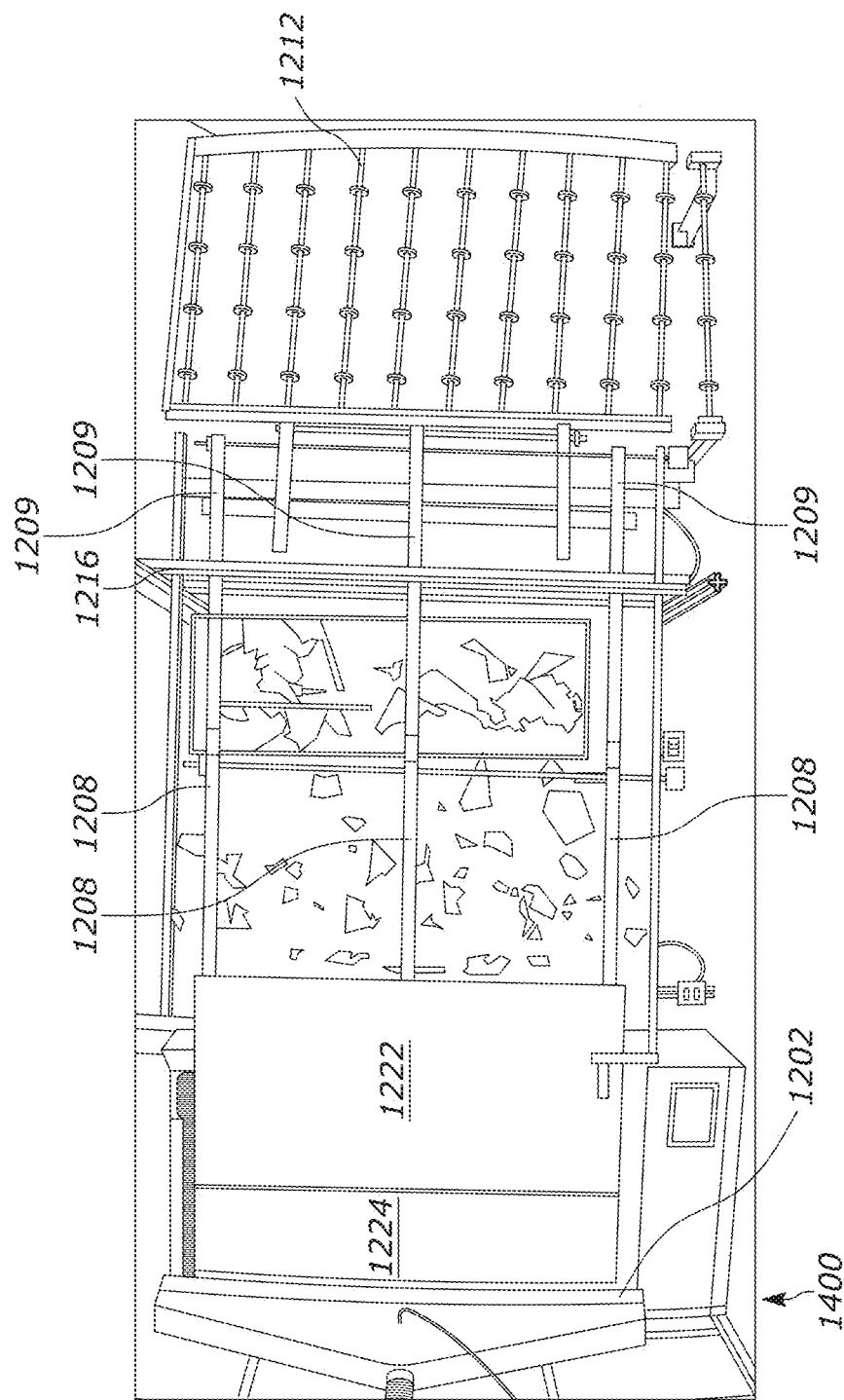
FIG. 14A shows an image of the monitored portion of the manufacturing line at a fifth time in accordance with an illustrative embodiment.
Figure 14B:
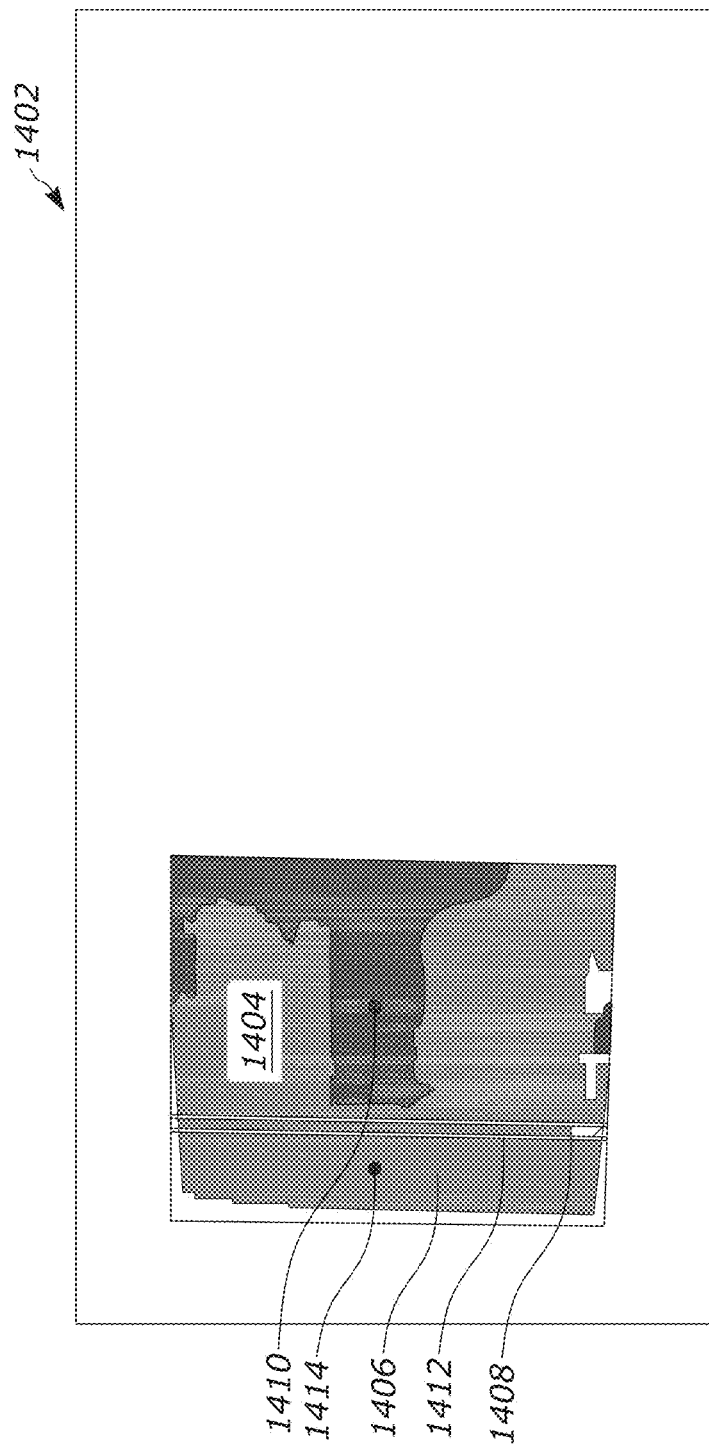
FIG. 14B shows an annotated image of the monitored portion of the manufacturing line at the fifth time in accordance with an illustrative embodiment.

Referring to FIG. 14A, a fifth image 1400 is shown that was captured at a fifth time that is prior to the second time shown in FIG. 12B. Referring to FIG. 14B, a first labeled pixel image 1402 is shown that was generated from fifth image 1400 by monitoring device 300. In operation 426, the pixels in first labeled pixel image 1402 shown in black were labeled as background pixels, in green were labeled as unbroken pixels, and in red were labeled as broken pixels. A third polygon 1404 and a fourth polygon 1406 were identified in operation 428 as a single polygon. Third polygon 1404 and fourth polygon 1406 were split in operation 432.

A third axis aligned polygon 1408 and a third axis aligned polygon centroid 1410 were defined in operation 440 from third polygon 1404. A fourth axis aligned polygon 1412 and a fourth axis aligned polygon centroid 1414 were defined in operation 440 from fourth polygon 1406. Third polygon 1404 includes pixels classified as broken and pixels classified as unbroken. Third polygon 1404 was classified as unbroken because the number of pixels included in third polygon 1404 that were classified as broken did not satisfy the polygon classification parameter.

Figure 15A:
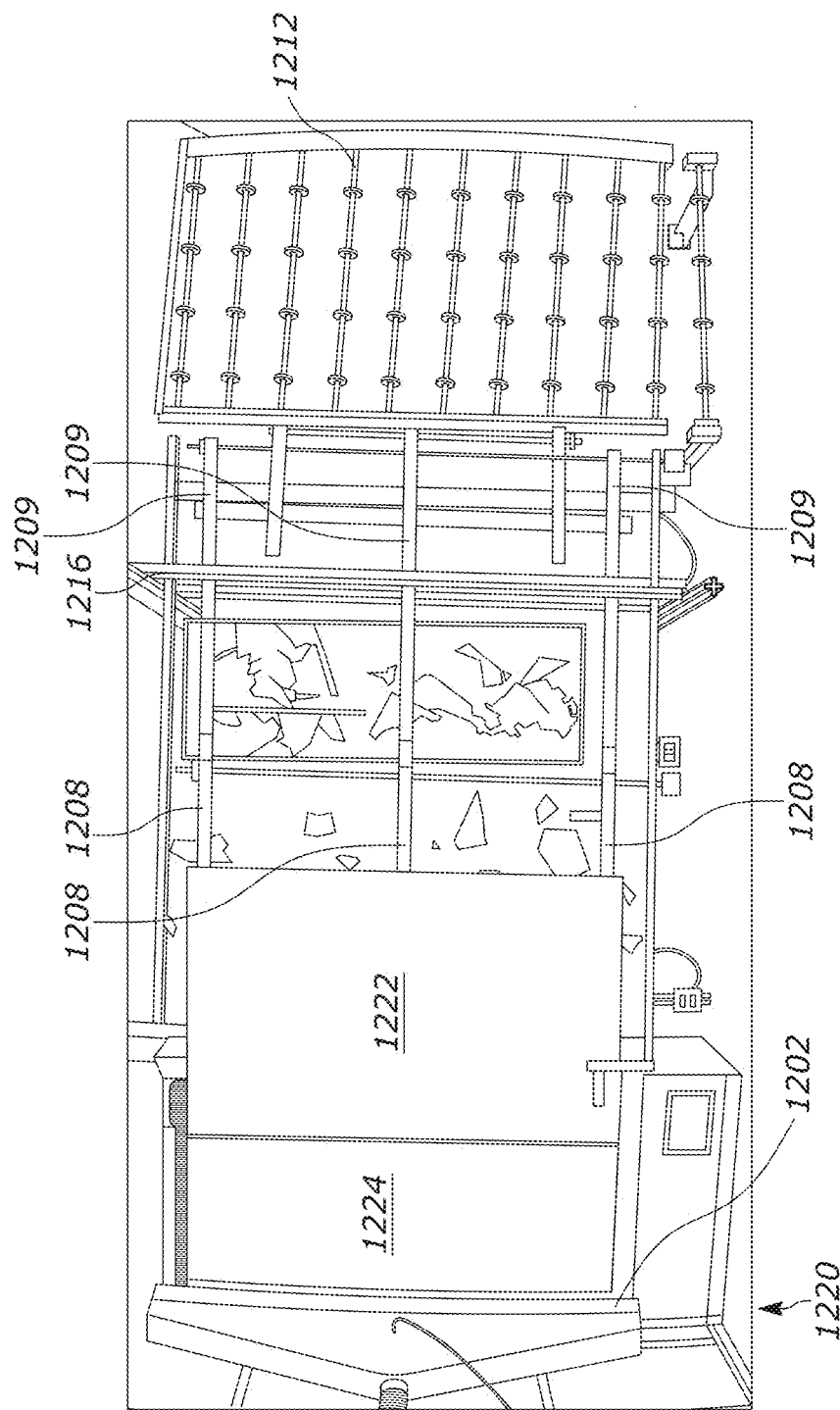
FIG. 15A shows an image of the monitored portion of the manufacturing line at the second time in accordance with an illustrative embodiment.
Figure 15B:
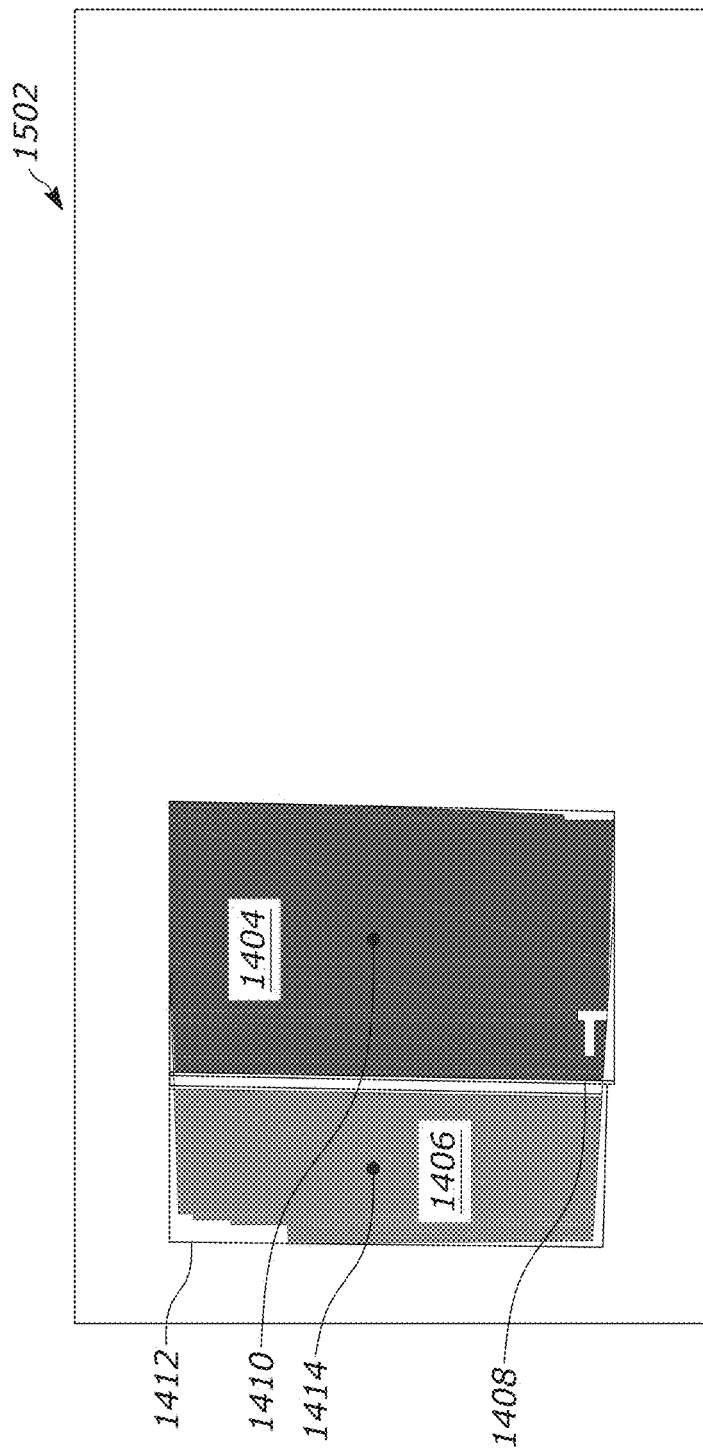
FIG. 15B shows an annotated image of the monitored portion of the manufacturing line at the second time in accordance with an illustrative embodiment.

Referring to FIG. 15A, second image 1220 is shown that was captured at the second time as shown in FIG. 12B. Referring to FIG. 15B, a second labeled pixel image 1502 is shown that was generated from second image 1220 by monitoring device 300. In operation 426, the pixels in second labeled pixel image 1502 shown in black were labeled as background pixels, in green were labeled as unbroken pixels, and in red were labeled as broken pixels. Third polygon 1404 and fourth polygon 1406 were identified as the same polygons based on the comparison in operation 442 and, as a result, assigned the same polygon identifiers in operation 444. A position of third axis aligned polygon 1408, third axis aligned polygon centroid 1410, fourth axis aligned polygon 1412, and fourth axis aligned polygon centroid 1414 was updated in operation 440. Almost all of the pixels included in third polygon 1404 were classified as broken resulting in third polygon 1404 being classified as broken. Third polygon 1404 associated with third solar panel 1222 was classified as broken while still in second zone 1316 well before passing under line scanner 1216.

Figure 16A:
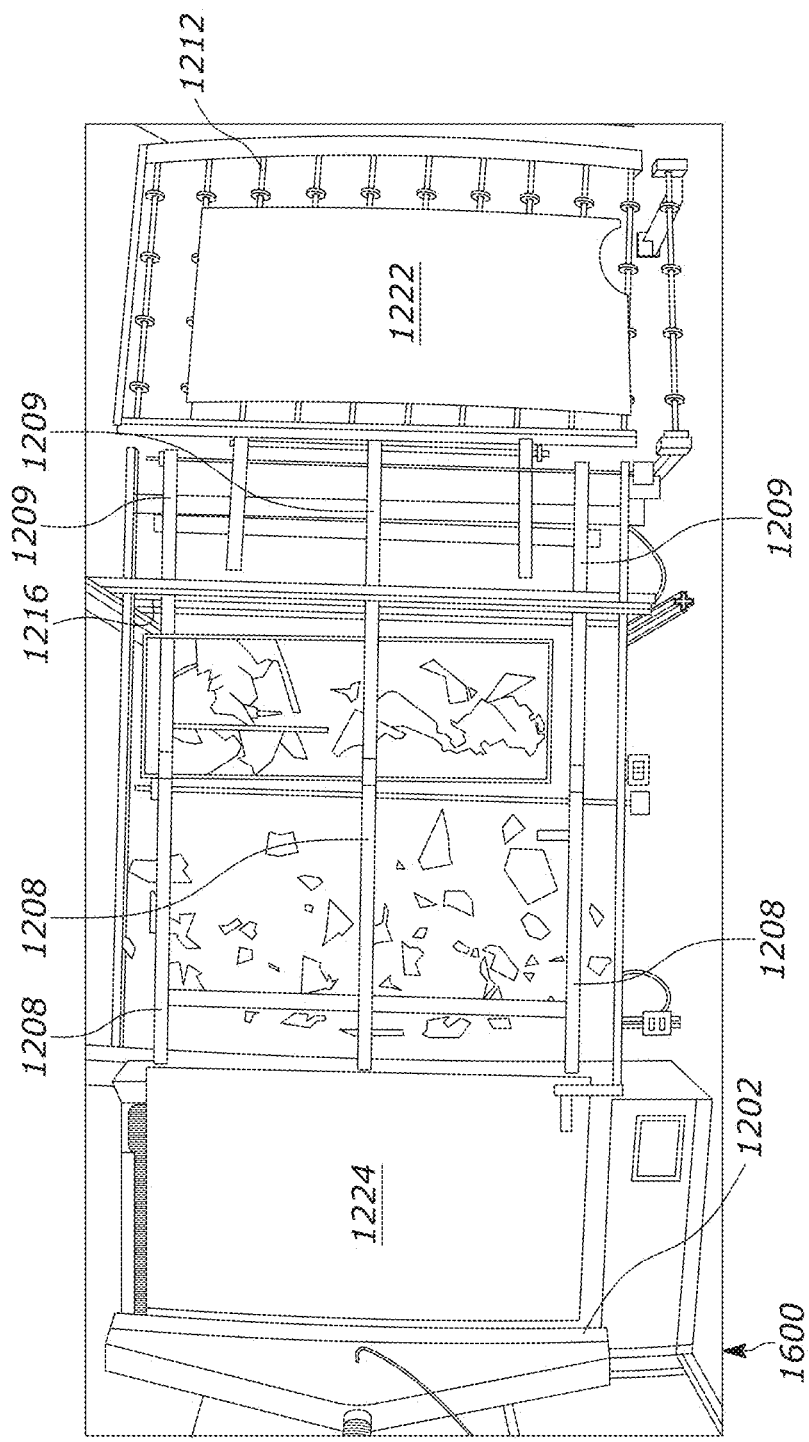
FIG. 16A shows an image of the monitored portion of the manufacturing line at the fourth time in accordance with an illustrative embodiment.
Figure 16B:
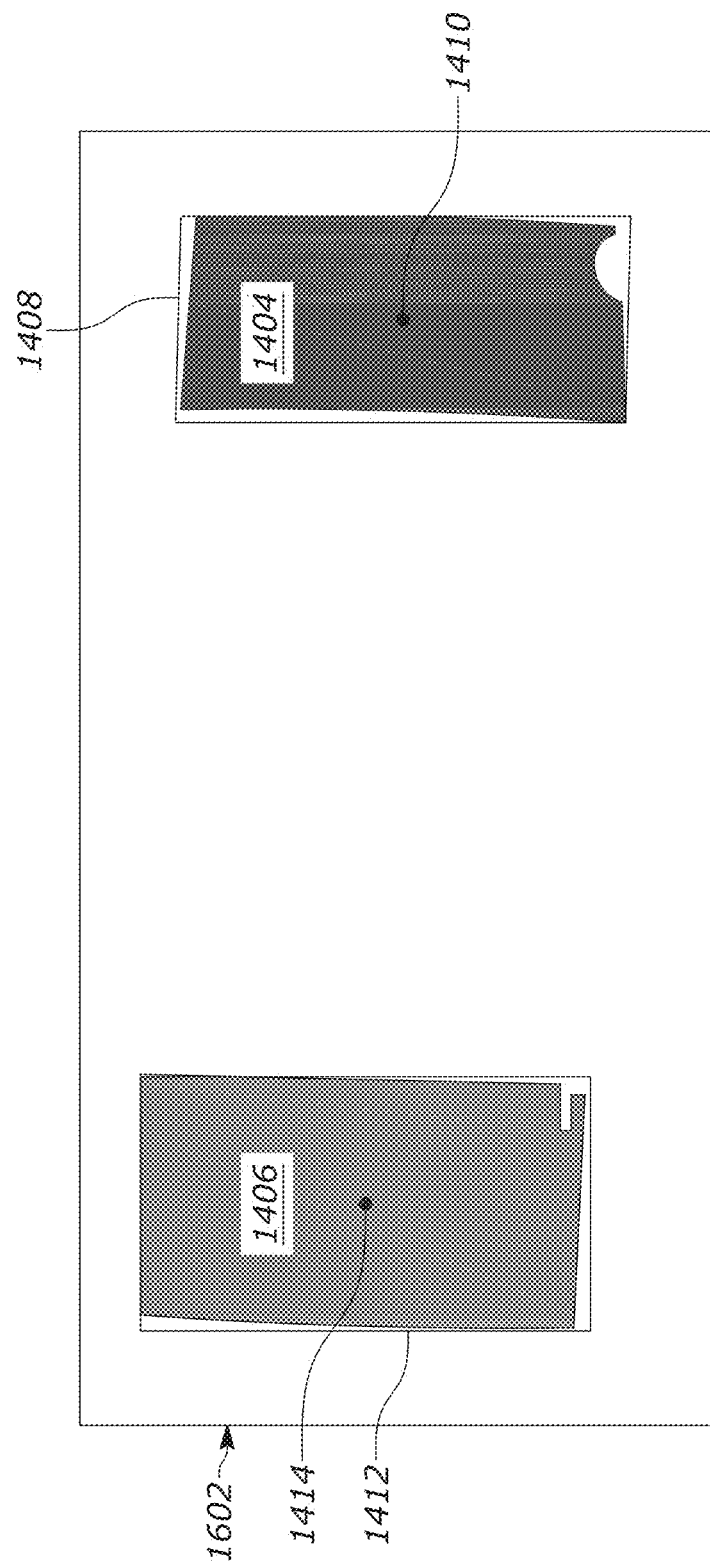
FIG. 16B shows an annotated image of the monitored portion of the manufacturing line at the fourth time in accordance with an illustrative embodiment.

Referring to FIG. 16A, fourth image 1240 is shown that was captured at the fourth time as shown in FIG. 12D. Referring to FIG. 16B, a third labeled pixel image 1602 is shown that was generated from second image 1220 by monitoring device 300. In operation 426, the pixels in third labeled pixel image 1602 shown in black were labeled as background pixels, in green were labeled as unbroken pixels, and in red were labeled as broken pixels. Third polygon 1404 and fourth polygon 1406 were identified as the same polygons based on the comparison in operation 442 and, as a result, assigned the same polygon identifiers in operation 444. A position of third axis aligned polygon 1408, third axis aligned polygon centroid 1410, fourth axis aligned polygon 1412, and fourth axis aligned polygon centroid 1414 was updated in operation 440. All of the pixels included in third polygon 1404 were classified as broken resulting in third polygon 1404 continuing to be classified as broken.

Information about the state of panels and their position along the conveyor belt was repeatedly submitted to manufacturing execution system 504 using a REST-API endpoint. Manufacturing execution system 504 in turn relayed the information to response controller 506, which controls the direction of bidirectional conveyor belt 1212 to either discard the panel or send the panel to the next stage of the manufacturing line. Because third solar panel 1222 associated with third polygon 1404 was classified as broken, third solar panel 1222 is correctly routed into dumpster 1210 unlike when line scanner 1216 was used.

Monitoring device 300 may be included in a larger manufacturing system. For example, the larger manufacturing system may include a plurality of monitoring devices monitoring the same type of conveyor belt section or another type of conveyor belt section all of which may be connected to communicate with manufacturing execution system 504. Each segmentation model may be trained separately based on the image area captured, the types of defects visible on the object, etc. Monitoring device 300 further can be deployed anywhere from the edge to the cloud to run in real-time and make timely decisions.

Monitoring device 300 can send analytical information about the state of the portion of the manufacturing system being monitored in either an open-loop or a closed-loop manner to enable decision-making with or without human intervention. For example, in the open-loop manner, a human may be alerted to the broken object and sent to manually discard the broken object into dumpster 1210. The human may be alerted using an event subscribing device that is a phone or a computer using second display 1016 and/or second speaker 1018. In the closed-loop manner, response controller 506 automatically responds, for example, by rerouting the broken object into dumpster 1210 when a signal is received from manufacturing execution system 504 based on input from monitoring device 300. Using ESP system 1700, the determinations can be performed in ~0.1 seconds depending on the characteristics of monitoring device 300 with the determination sent to response controller 506 in less than half a second.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    (A) receive an image of at least a portion of a manufacturing line that includes one or more objects in a process of being manufactured;
    (B) classify each pixel included in the image as one of a background pixel class, a non-defective object class, or a defective object class using a trained neural network model, wherein the background pixel class classification indicates a pixel that is not representative of the one or more objects in the process of being manufactured;
    (C) group the pixels included in the image that were classified as the non-defective object class or the defective object class into one or more shapes, wherein each shape is defined by a contiguous group of pixels classified as the non-defective object class or the defective object class;
    (D) classify each shape of the one or more shapes in the non-defective object class or in the defective object class based on a number of pixels included in a respective shape that are classified in the non-defective object class relative to a number of pixels included in the respective shape that are classified in the defective object class; and
    (E) output the classification for each shape as the non-defective object class or the defective object class.

2. The non-transitory computer-readable medium of claim 1, wherein a shape is selected from the group consisting of a polygonal shape, an elliptical shape, and an irregular shape.

3. The non-transitory computer-readable medium of claim 1, wherein the defective object class includes a plurality of classes.

4. The non-transitory computer-readable medium of claim 3, wherein the plurality of classes comprises a broken object class and a cracked object class.

5. The non-transitory computer-readable medium of claim 1, wherein outputting the classification for each shape comprises sending an alert message when the classification of a shape is the defective object class.

6. The non-transitory computer-readable medium of claim 1, wherein outputting the classification for each shape comprises sending a message to a response controller configured to control removal of an object of the one or more objects on the manufacturing line associated with the shape classified in the defective object class.

7. The non-transitory computer-readable medium of claim 1, wherein a shape of the one or more shapes is classified in the defective object class when the number of pixels included in the respective contiguous group classified in the defective object class is greater than or equal to the number of pixels included in the respective contiguous group classified in the non-defective object class.

8. The non-transitory computer-readable medium of claim 1, wherein a shape of the one or more shapes is classified in the defective object class when a percentage value is greater than or equal to a predefined classification threshold, wherein the percentage value is the number of pixels included in the respective contiguous group classified in the defective object class divided by a total number of pixels included in the respective polygon.

9. The non-transitory computer-readable medium of claim 1, wherein, in (C), the contiguous group of pixels includes greater than or equal to a predefined number of pixels before a shape is defined.

10. The non-transitory computer-readable medium of claim 1, wherein, in (C), a single shape is defined from a contiguous group of pixels included interior of a second contiguous group of pixels.

11. The non-transitory computer-readable medium of claim 1, wherein, in (C), a shape of the one or more shapes is split into two shapes based on a predefined object extremum criterion defined for an object of the one or more objects.

12. The non-transitory computer-readable medium of claim 1, wherein the image is received by reading the image from an image dataset.

13. The non-transitory computer-readable medium of claim 1, wherein the image is received from a second computing device.

14. The non-transitory computer-readable medium of claim 1, wherein the image is received from a sensor.

15. The non-transitory computer-readable medium of claim 1, wherein before (B), the computer-readable instructions further cause the computing device to crop the received image based on a predefined image cropping criterion, wherein the cropped image is classified in (B).

16. The non-transitory computer-readable medium of claim 1, wherein before (B), the computer-readable instructions further cause the computing device to resize the received image based on a predefined image resizing criterion, wherein the resized image is classified in (B).

17. The non-transitory computer-readable medium of claim 1, wherein the computer-readable instructions further cause the computing device to repeat (A) through (E) with successive images.

18. The non-transitory computer-readable medium of claim 1, wherein the computer-readable instructions further cause the computing device to repeat (A) through (E) with a second image, wherein the second image is of a same portion of the manufacturing line.

19. The non-transitory computer-readable medium of claim 1, wherein after (D), the computer-readable instructions further cause the computing device to:
(F) define an axis aligned bounding box for each shape of the one or more shapes, wherein the axis aligned bounding box is aligned with an x-axis and a y-axis defined by dimensions of the received image, wherein the axis aligned bounding box surrounds a respective shape of the one or more shapes; and
(G) define a centroid for each axis aligned bounding box.

20. The non-transitory computer-readable medium of claim 19, wherein after (G), the computer-readable instructions further cause the computing device to assign a unique shape identifier to each shape of the one or more shapes.

21. The non-transitory computer-readable medium of claim 19, wherein after (G), the computer-readable instructions further cause the computing device to:
(H) receive a second image of the at least portion of the manufacturing line;
(I) classify each pixel included in the second image as the background pixel class, the non-defective object class, or the defective object class using the trained neural network model;
(J) group the pixels included in the second image that were classified as the non-defective object class or the defective object class into one or more second shapes, wherein each second shape of the one or more second shapes is defined by a second contiguous group of pixels classified as the non-defective object class or the defective object class;
(K) classify each second shape in the non-defective object class or in the defective object class based on the number of pixels included in a respective second shape that are classified in the non-defective object class relative to a number of pixels included in the respective second shape that are classified in the defective object class;
(L) define a second axis aligned bounding box for each shape of the one or more second shapes, wherein the second axis aligned bounding box is aligned with the x-axis and the y-axis defined by dimensions of the received second image, wherein the second axis aligned bounding box surrounds a respective shape of the one or more second shapes;
(M) define a second centroid for each second axis aligned bounding box;
(N) compare each second axis aligned bounding box to each axis aligned bounding box to determine that a respective second axis aligned bounding box represents a same object as a respective axis aligned bounding box; and
(O) when the respective second axis aligned bounding box represents the same object as the respective axis aligned bounding box, classify a respective second shape based on a comparison between the classification in (D) for the respective second shape and the classification in (D) for the respective shape of the one or more shapes.

22. The non-transitory computer-readable medium of claim 1, wherein the trained neural network model comprises an encoder and a decoder architecture, wherein the encoder reduces a spatial dimension of the received image with a pooling layer and the decoder recovers the spatial dimension of the received image.

23. The non-transitory computer-readable medium of claim 1, wherein (A) through (E) are performed by an event stream processing engine of an event stream processing system.

24. The non-transitory computer-readable medium of claim 23, wherein the image is received from an event publishing device of the event stream processing system that is in communication with the computing device.

25. The non-transitory computer-readable medium of claim 24, wherein the classification for each shape is output in (E) by sending the classification for each shape to an event subscribing device of the event stream processing system that is in communication with the computing device.

26. The non-transitory computer-readable medium of claim 25, wherein the event subscribing device is a manufacturing execution system.

27. The non-transitory computer-readable medium of claim 19, wherein after (G), the computer-readable instructions further cause the computing device to determine a zone location for each shape of the one or more shapes using predefined values for zone parameters and the centroid for a respective shape for which the axis aligned bounding box is defined.

28. The non-transitory computer-readable medium of claim 1, wherein the neural network model is trained using a plurality of images of the at least portion of the manufacturing line, wherein the plurality of images includes a plurality of defective objects and a plurality of non-defective objects.

29. A computing device comprising:
a processor; and
a non-transitory computer-readable medium operably coupled to the processor, the computer-readable medium having computer-readable instructions stored thereon that, when executed by the processor, cause the computing device to
receive an image of at least a portion of a manufacturing line that includes one or more objects in a process of being manufactured;

classify each pixel included in the image as one of a background pixel class, a non-defective object class, or a defective object class using a trained neural network model, wherein the background pixel class classification indicates a pixel that is not representative of the one or more objects in the process of being manufactured;

group the pixels included in the image that were classified as the non-defective object class or the defective object class into one or more shapes, wherein each shape is defined by a contiguous group of pixels classified as the non-defective object class or the defective object class;

classify each shape in the non-defective object class or in the defective object class based on a number of pixels included in a respective shape that are classified in the non-defective object class relative to a number of pixels included in the respective shape that are classified in the defective object class; and output the classification for each shape as the non-defective object class or the defective object class.

30. A method of detecting a defective object, the method comprising:

receiving, by a computing device, an image of at least a portion of a manufacturing line that includes one or more objects in a process of being manufactured;

classifying, by the computing device, each pixel included in the image as one of a background pixel class, a non-defective object class, or a defective object class using a trained neural network model, wherein the background pixel class classification indicates a pixel that is not representative of the one or more objects in the process of being manufactured;

grouping, by the computing device, the pixels included in the image that were classified as the non-defective object class or the defective object class into one or more shapes, wherein each shape is defined by a contiguous group of pixels classified as the non-defective object class or the defective object class;

classifying, by the computing device, each shape in the non-defective object class or in the defective object class based on a number of pixels included in a respective shape that are classified in the non-defective object class relative to a number of pixels included in the respective shape that are classified in the defective object class; and outputting, by the computing device, the classification for each shape as the non-defective object class or the defective object class.

* * * * *